United States Patent
Gray et al.

(10) Patent No.: US 10,841,245 B2
(45) Date of Patent: Nov. 17, 2020

(54) WORK UNIT STACK DATA STRUCTURES IN MULTIPLE CORE PROCESSOR SYSTEM FOR STREAM DATA PROCESSING

(71) Applicant: Fungible, Inc., Santa Clara, CA (US)

(72) Inventors: Charles Edward Gray, San Francisco, CA (US); Bertrand Serlet, Palo Alto, CA (US); Felix A. Marti, San Francisco, CA (US); Wael Noureddine, Santa Clara, CA (US); Pratapa Reddy Vaka, Saratoga, CA (US)

(73) Assignee: Fungible, Inc., Santa Clara, CA (US)

( * ) Notice: Subject to any disclaimer, the term of this patent is extended or adjusted under 35 U.S.C. 154(b) by 28 days.

(21) Appl. No.: 16/197,179

(22) Filed: Nov. 20, 2018

(65) Prior Publication Data

US 2019/0158428 A1    May 23, 2019

Related U.S. Application Data

(60) Provisional application No. 62/589,427, filed on Nov. 21, 2017.

(51) Int. Cl.
*H04L 12/947* (2013.01)
*H04L 12/851* (2013.01)
(Continued)

(52) U.S. Cl.
CPC ........ *H04L 49/252* (2013.01); *G06F 9/45558* (2013.01); *G06F 9/5038* (2013.01);
(Continued)

(58) Field of Classification Search
None
See application file for complete search history.

(56) References Cited

U.S. PATENT DOCUMENTS

| | | |
|---|---|---|
| 5,301,324 A | 4/1994 | Dewey et al. |
| 5,828,860 A | 10/1998 | Miyaoku et al. |

(Continued)

FOREIGN PATENT DOCUMENTS

| | | |
|---|---|---|
| EP | 1079571 A2 | 2/2001 |
| EP | 1489796 A2 | 12/2004 |

(Continued)

OTHER PUBLICATIONS

"QFX10000 Switches System Architecture," White Paper, Juniper Networks, Apr. 2015, 15 pp.
(Continued)

*Primary Examiner* — Scott B Christensen
(74) *Attorney, Agent, or Firm* — Shumaker & Sieffert, P.A.

(57) ABSTRACT

Techniques are described in which a device, such as a network device, compute node or storage device, is configured to utilize a work unit (WU) stack data structure in a multiple core processor system to help manage an event driven, run-to-completion programming model of an operating system executed by the multiple core processor system. The techniques may be particularly useful when processing streams of data at high rates. The WU stack may be viewed as a stack of continuation work units used to supplement a typical program stack as an efficient means of moving the program stack between cores. The work unit data structure itself is a building block in the WU stack to compose a processing pipeline and services execution. The WU stack structure carries state, memory, and other information in auxiliary variables.

33 Claims, 17 Drawing Sheets

(51) Int. Cl.
*G06F 9/455* (2018.01)
*H04L 12/747* (2013.01)
*H04L 29/08* (2006.01)
*G06F 9/50* (2006.01)
*H04L 12/879* (2013.01)
*H04L 12/935* (2013.01)

(52) U.S. Cl.
CPC ........ *H04L 45/742* (2013.01); *H04L 47/2483* (2013.01); *H04L 67/1004* (2013.01); *H04L 69/321* (2013.01); *G06F 2009/45595* (2013.01); *H04L 49/3063* (2013.01); *H04L 49/9026* (2013.01)

(56) References Cited

U.S. PATENT DOCUMENTS

| | | | |
|---|---|---|---|
| 6,021,473 | A | 2/2000 | Davis et al. |
| 6,055,579 | A | 4/2000 | Goyal et al. |
| 6,314,491 | B1 | 11/2001 | Freerksen et al. |
| 6,842,906 | B1 | 1/2005 | Bowman-Amuah |
| 6,901,451 | B1 | 5/2005 | Miyoshi et al. |
| 6,901,500 | B1 | 5/2005 | Hussain et al. |
| 6,993,630 | B1 | 1/2006 | Williams et al. |
| 7,035,914 | B1 | 4/2006 | Payne et al. |
| 7,289,964 | B1 * | 10/2007 | Bowman-Amuah ........................ G06F 9/5038 705/1.1 |
| 7,486,678 | B1 | 2/2009 | Devanagondi et al. |
| 7,664,110 | B1 | 2/2010 | Lovett et al. |
| 7,822,731 | B1 | 10/2010 | Yu et al. |
| 7,843,907 | B1 | 11/2010 | Abou-Emara et al. |
| 8,560,757 | B2 | 10/2013 | Pangborn et al. |
| 8,599,863 | B2 | 12/2013 | Davis |
| 8,625,427 | B1 | 1/2014 | Terry et al. |
| 8,737,410 | B2 | 5/2014 | Davis et al. |
| 8,850,101 | B2 | 9/2014 | Pangborn et al. |
| 8,850,125 | B2 | 9/2014 | Pangborn et al. |
| 8,966,152 | B2 | 2/2015 | Bouchard et al. |
| 9,065,860 | B2 | 6/2015 | Pangborn et al. |
| 9,262,225 | B2 | 2/2016 | Davis et al. |
| 9,294,304 | B2 | 3/2016 | Sindhu |
| 9,294,398 | B2 | 5/2016 | DeCusatis et al. |
| 9,405,550 | B2 | 8/2016 | Biran et al. |
| 9,569,366 | B2 | 2/2017 | Pangborn et al. |
| 9,632,936 | B1 | 4/2017 | Zuckerman et al. |
| 9,853,901 | B2 | 12/2017 | Kampmann et al. |
| 9,876,735 | B2 | 1/2018 | Davis et al. |
| 9,946,671 | B1 | 4/2018 | Tawri et al. |
| 10,135,731 | B2 | 11/2018 | Davis et al. |
| 10,140,245 | B2 | 11/2018 | Davis et al. |
| 10,304,154 | B2 | 5/2019 | Appu et al. |
| 10,387,179 | B1 * | 8/2019 | Hildebrant .......... G06F 9/45533 |
| 10,425,707 | B2 | 9/2019 | Sindhu et al. |
| 10,540,288 | B2 | 1/2020 | Noureddine et al. |
| 10,565,112 | B2 | 2/2020 | Noureddine et al. |
| 10,645,187 | B2 | 5/2020 | Goyal et al. |
| 2002/0015387 | A1 | 2/2002 | Houh |
| 2002/0049859 | A1 | 4/2002 | Bruckert et al. |
| 2002/0094151 | A1 | 7/2002 | Li |
| 2002/0118415 | A1 | 8/2002 | Dasylva et al. |
| 2002/0126634 | A1 | 9/2002 | Mansharamani et al. |
| 2002/0126671 | A1 | 9/2002 | Ellis et al. |
| 2003/0043798 | A1 | 3/2003 | Pugel |
| 2003/0091271 | A1 | 5/2003 | Dragone |
| 2004/0236912 | A1 | 11/2004 | Glasco |
| 2005/0166086 | A1 | 7/2005 | Watanabe |
| 2006/0029323 | A1 | 2/2006 | Nikonov et al. |
| 2006/0056406 | A1 | 3/2006 | Bouchard et al. |
| 2006/0112226 | A1 | 5/2006 | Hady et al. |
| 2006/0277421 | A1 | 12/2006 | Balestriere |
| 2007/0073966 | A1 | 3/2007 | Corbin |
| 2007/0172235 | A1 | 7/2007 | Snider et al. |
| 2007/0192545 | A1 | 8/2007 | Gara et al. |
| 2007/0198656 | A1 | 8/2007 | Mazzaferri et al. |
| 2007/0255906 | A1 | 11/2007 | Handgen et al. |
| 2008/0002702 | A1 * | 1/2008 | Bajic .................... G06F 9/5055 370/392 |
| 2008/0138067 | A1 | 6/2008 | Beshai |
| 2008/0244231 | A1 | 10/2008 | Kunze et al. |
| 2009/0024836 | A1 | 1/2009 | Shen et al. |
| 2009/0083263 | A1 * | 3/2009 | Felch ................... G06F 9/3851 |
| 2009/0135832 | A1 | 5/2009 | Fan et al. |
| 2009/0228890 | A1 | 9/2009 | Vaitovirta et al. |
| 2009/0234987 | A1 * | 9/2009 | Lee ...................... G06F 9/5038 710/39 |
| 2009/0285228 | A1 | 11/2009 | Bagepalli et al. |
| 2009/0303880 | A1 | 12/2009 | Maltz et al. |
| 2010/0061391 | A1 | 3/2010 | Sindhu et al. |
| 2010/0318725 | A1 | 12/2010 | Kwon |
| 2011/0055827 | A1 | 3/2011 | Lin et al. |
| 2011/0113184 | A1 | 3/2011 | Chu |
| 2011/0173392 | A1 | 7/2011 | Gara et al. |
| 2011/0202658 | A1 | 8/2011 | Okuno et al. |
| 2011/0225594 | A1 | 9/2011 | Iyengar et al. |
| 2011/0228783 | A1 | 9/2011 | Flynn et al. |
| 2011/0238923 | A1 | 9/2011 | Hooker et al. |
| 2011/0289179 | A1 | 11/2011 | Pekcan et al. |
| 2011/0289180 | A1 | 11/2011 | Sonnier et al. |
| 2011/0289279 | A1 | 11/2011 | Sonnier et al. |
| 2012/0030431 | A1 | 2/2012 | Anderson et al. |
| 2012/0036178 | A1 | 2/2012 | Gavini et al. |
| 2012/0096211 | A1 | 4/2012 | Davis et al. |
| 2012/0207165 | A1 | 8/2012 | Davis |
| 2012/0254587 | A1 | 10/2012 | Biran et al. |
| 2012/0314710 | A1 | 12/2012 | Shikano |
| 2013/0003725 | A1 | 1/2013 | Hendel et al. |
| 2013/0024875 | A1 * | 1/2013 | Wang .................... G06F 13/22 719/318 |
| 2013/0028083 | A1 | 1/2013 | Yoshida et al. |
| 2013/0088971 | A1 | 4/2013 | Anantharam et al. |
| 2013/0145375 | A1 | 6/2013 | Kang |
| 2013/0191443 | A1 | 7/2013 | Gan et al. |
| 2014/0023080 | A1 | 1/2014 | Zhang et al. |
| 2014/0040909 | A1 | 2/2014 | Winser et al. |
| 2014/0044128 | A1 | 2/2014 | Suresh et al. |
| 2014/0059537 | A1 | 2/2014 | Kamble et al. |
| 2014/0187317 | A1 | 7/2014 | Kohler et al. |
| 2014/0258479 | A1 | 9/2014 | Tenginakai et al. |
| 2014/0310467 | A1 * | 10/2014 | Shalf .................... G06F 15/7825 711/119 |
| 2014/0359044 | A1 | 12/2014 | Davis et al. |
| 2015/0019702 | A1 | 1/2015 | Kancherla |
| 2015/0037032 | A1 | 2/2015 | Xu et al. |
| 2015/0117860 | A1 | 4/2015 | Braun |
| 2015/0143045 | A1 | 5/2015 | Han et al. |
| 2015/0143073 | A1 | 5/2015 | Winser et al. |
| 2015/0163171 | A1 | 6/2015 | Sindhu et al. |
| 2015/0180603 | A1 | 6/2015 | Darling et al. |
| 2015/0186313 | A1 | 7/2015 | Sodhi et al. |
| 2015/0244617 | A1 | 8/2015 | Nakil et al. |
| 2015/0278148 | A1 | 10/2015 | Sindhu et al. |
| 2015/0278984 | A1 | 10/2015 | Koker et al. |
| 2015/0280939 | A1 | 10/2015 | Sindhu |
| 2015/0281128 | A1 | 10/2015 | Sindhu |
| 2015/0324205 | A1 | 11/2015 | Eisen et al. |
| 2015/0325272 | A1 | 11/2015 | Murphy |
| 2015/0334034 | A1 | 11/2015 | Smedley et al. |
| 2015/0334202 | A1 | 11/2015 | Frydman et al. |
| 2015/0378776 | A1 | 12/2015 | Lippett |
| 2015/0381528 | A9 | 12/2015 | Davis et al. |
| 2016/0056911 | A1 | 2/2016 | Ye et al. |
| 2016/0062800 | A1 * | 3/2016 | Stanfill ................. G06F 9/5038 718/104 |
| 2016/0092362 | A1 | 3/2016 | Barron et al. |
| 2016/0164625 | A1 | 6/2016 | Gronvall et al. |
| 2016/0210159 | A1 * | 7/2016 | Wilson ................. G06F 9/4411 |
| 2016/0239415 | A1 | 8/2016 | Davis et al. |
| 2016/0241430 | A1 | 8/2016 | Yadav et al. |
| 2016/0337723 | A1 | 11/2016 | Graves |
| 2016/0364333 | A1 | 12/2016 | Brown et al. |
| 2016/0364334 | A1 | 12/2016 | Asaro et al. |
| 2016/0380885 | A1 | 12/2016 | Jani et al. |
| 2017/0031719 | A1 | 2/2017 | Clark et al. |

(56) References Cited

U.S. PATENT DOCUMENTS

| | | | |
|---|---|---|---|
| 2017/0060615 A1* | 3/2017 | Thakkar | G06F 9/45558 |
| 2017/0061566 A1 | 3/2017 | Min et al. | |
| 2017/0068639 A1 | 3/2017 | Davis et al. | |
| 2017/0235581 A1 | 8/2017 | Nickolls et al. | |
| 2017/0286143 A1* | 10/2017 | Wagner | G06F 9/45516 |
| 2017/0286157 A1 | 10/2017 | Hasting et al. | |
| 2017/0346766 A1 | 11/2017 | Dutta | |
| 2018/0011739 A1* | 1/2018 | Pothula | G06F 9/50 |
| 2018/0024771 A1 | 1/2018 | Miller et al. | |
| 2018/0115494 A1 | 4/2018 | Bhatia et al. | |
| 2018/0152317 A1 | 5/2018 | Chang et al. | |
| 2018/0239702 A1 | 8/2018 | Farahani et al. | |
| 2018/0287818 A1 | 10/2018 | Goel et al. | |
| 2018/0287965 A1 | 10/2018 | Sindhu et al. | |
| 2018/0288505 A1 | 10/2018 | Sindhu et al. | |
| 2018/0293168 A1 | 10/2018 | Noureddine et al. | |
| 2018/0300928 A1 | 10/2018 | Koker et al. | |
| 2018/0307494 A1 | 10/2018 | Ould-Ahmed-Vall et al. | |
| 2018/0307535 A1 | 10/2018 | Suzuki et al. | |
| 2018/0322386 A1 | 11/2018 | Sridharan et al. | |
| 2018/0357169 A1 | 12/2018 | Lai | |
| 2019/0005176 A1 | 1/2019 | Illikkal et al. | |
| 2019/0012278 A1 | 1/2019 | Sindhu et al. | |
| 2019/0012350 A1 | 1/2019 | Sindhu et al. | |
| 2019/0013965 A1 | 1/2019 | Sindhu et al. | |
| 2019/0018806 A1 | 1/2019 | Koufaty et al. | |
| 2019/0042292 A1 | 2/2019 | Palermo et al. | |
| 2019/0042518 A1 | 2/2019 | Marolia et al. | |
| 2019/0095333 A1 | 3/2019 | Heirman et al. | |
| 2019/0102311 A1 | 4/2019 | Gupta et al. | |
| 2019/0104057 A1 | 4/2019 | Goel et al. | |
| 2019/0104206 A1 | 4/2019 | Goel et al. | |
| 2019/0104207 A1 | 4/2019 | Goel et al. | |
| 2019/0158428 A1 | 5/2019 | Gray et al. | |
| 2019/0188079 A1 | 6/2019 | Kohli | |
| 2019/0243765 A1 | 8/2019 | Sindhu et al. | |
| 2020/0021664 A1 | 1/2020 | Goyal et al. | |
| 2020/0119903 A1 | 4/2020 | Thomas et al. | |
| 2020/0145680 A1 | 5/2020 | Dikshit et al. | |
| 2020/0159568 A1 | 5/2020 | Goyal et al. | |
| 2020/0159859 A1 | 5/2020 | Beckman et al. | |

FOREIGN PATENT DOCUMENTS

| | | |
|---|---|---|
| EP | 1501246 A2 | 1/2005 |
| EP | 2289206 A2 | 3/2011 |
| EP | 2928134 A2 | 7/2015 |
| WO | 2009114554 A2 | 9/2009 |
| WO | 2013184846 A1 | 12/2013 |
| WO | 2014178854 A1 | 11/2014 |
| WO | 2016037262 A1 | 3/2016 |
| WO | 2019014268 A1 | 1/2019 |

OTHER PUBLICATIONS

Adya et al., "Cooperative Task Management without Manual Stack Management," Proceedings of the 2002 Usenix Annual Technical Conference, Jun. 2002, 14 pp.

Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.

Alizadeh et al., "CONGA: Distributed Congestion-Aware Load Balancing for Datacenters," SIGCOMM '14 Proceedings of the 2014 ACM Conference on SIGCOMM, Aug. 17-22, 2014, pp. 503-514.

Bakkum et al., "Accelerating SQL Database Operations on a GPU with CUDA," Proceedings of the 3rd Workshop on Genral-Purpose Computation on Graphics Processing Units, Mar. 14, 2010, 10 pp.

Ganga et al., "Better operating system features for faster network servers," ACM Sigmetrics Performance Evaluation Review, vol. 26, Issue 3, Dec. 1998, 11 pp.

Barroso et al., "Attack of the killer Microseconds," Communications of the ACM, vol. 60, No. 4, Apr. 2017, 7 pp.

Benson et al., "MicroTE: Fine Grained Traffic Engineering for Data Centers," CoNEXT '11 Proceedings of the Seventh Conference on emerging Networking EXperiments and Technologies Article No. 8, Dec. 6-9, 2011, 12 pp.

Benson et al., "Network Traffic Characteristics of Data Centers in the Wild," IMC '10 Proceedings of the 10th ACM SIGCOMM Conference on Internet Measurement, Nov. 1-30, 2010, pp. 267-280.

Ford et al., "TCP Extensions for Multipath Operation with Multiple Addresses," Internet Engineering Task Force (IETF), RFC 6824, Jan. 2013, 64 pp.

Friedman et al., "Programming with Continuations," Technical Report 151, Nov. 1983, 14 pp.

Gay et al., "The nesC Language: A Holistic Approach to Networked Embedded Systems," accessed from http://nescc.sourceforge.net, last updated Dec. 14, 2004, 11 pp.

Halbwachs et al., "The Synchronous Data Flow Programming Language LUSTRE," Proceedings of the IEEE, vol. 79, No. 9, Sep. 1991, 16 pp.

Haynes et al., "Continuations and Coroutines," Technical Report No. 158, Jun. 1984, 19 pp.

Hewitt, "Viewing Control Structures as Patterns of Passing Messages," Massachusetts Institute of Technology, Artificial Intelligence Laboratory, Dec. 1976, 61 pp.

Hseush et al., Data Path Debugging: Data-Oriented Debugging for a Concurrent Programming Language, PADD 88 Proceedings of the 1988 ACM SIGPLAN and SIGOPS workshop on Parallel and distributed debugging, May 5-6, 1988, 12 pp.

Huang et al., "Erasure Coding in Windows Azure Storage," 2012 USENIX Annual Technical Conference, Jun. 13-15, 2012, 12 pp.

Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.

Kahn et al., "Actors as a Special Case of Concurrent Constraint Programming," ECOOP/OOPSLA '90 Proceedings, Oct. 21-25, 1990, 10 pp.

Kaminow, "Optical Integrated Circuits: A Personal Perspective," Journal of Lightwave Technology, vol. 26, No. 9, May 1, 2008, pp. 994-1004.

Kandula et al., "Dynamic Load Balancing Without Packet Reordering," SIGCOMM Computer Communication Review, vol. 37, No. 2, Apr. 2007, pp. 53-62.

Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.

Kelly et al., A Block Diagram Compiler, The Bell System Technical Journal, Dec. 7, 1960, 10 pp.

Kounavis et al., "Programming the data path in network processor-based routers," Software—Practice and Experience, Oct. 21, 2005, 38 pp.

Larus et al., "Using Cohort Scheduling to Enhance Server Performance," Usenix Annual Technical Conference, Jun. 2002, 12 pp.

Levis et al., "Tiny OS: An Operating System for Sensor Networks," Ambient Intelligence, Jan. 2005, 34 pp.

Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.

Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.

Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.

Schroeder et al., "Flash Reliability in Production: The Expected and the Unexpected," 14th USENIX Conference on File and Storage Technologies (FAST '16), Feb. 22-25, 2016, 15 pp.

Varela et al., "The Salsa Programming Language 2.0.0alpha Release Tutorial," Tensselaer Polytechnic Institute, Nov. 2009, 52 pp.

(56) References Cited

OTHER PUBLICATIONS

Von Behren et al., "Why Events are a Bad Idea (for high-concurrency servers)," Proceedings of HotOS IX, May 2003, 6 pp.

Welsh et al., "SEDA: An Architecture for Well-Conditioned, Scalable Internet Services," Eighteenth Symposium on Operating Systems Principles, Oct. 21-24, 2001, 14 pp.

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

International Search Report and Written Opinion of International Application No. PCT/US2018/062117, dated Mar. 8, 2019, 14 pp.

Response to Written Opinion from International Application No. PCT/US2018/062117, filed Jun. 11, 2019, pp.

Second Written Opinion of the International Preliminary Examining Authority Application No. PCT/US2018/062117, dated Nov. 5, 2019, 25 pp.

U.S. Appl. No. 16/169,736, filed Oct. 24, 2018, naming inventors Goyal et al.

Deutsch, "DEFLATE Compressed Data Format Specification version 1.3," IETF Network Working Group, RFC 1951, May 1996, 15 pp.

Hurson, "Advances in Computers, vol. 92," Jan. 13, 2014, Academic Press, XP055510879, 94-95 pp.

Wang et al., "A Spatial and Temporal Locality-Aware Adaptive Cache Design with Network Optimization for Tiled Many-Core Architectures," IEEE Transactions on Very Large Scale Integration (VLSI) Systems, vol. 25. No. 9, Sep. 2017, pp. 2419-2433.

Office Action from U.S. Appl. No. 16/031,945, dated Jan. 24, 2020, 14 pp.

Notice of Allowance from U.S. Appl. No. 16/031,945, dated May 1, 2020, 6 pp.

International Preliminary Report on Patentability from International Application No. PCT/US2018/062117, dated Mar. 18, 2020, 41 pp.

Office Action from U.S. Appl. No. 16/198,607, dated May 1, 2020, 10 pp.

Amendment in Response to Office Action dated Jan. 24, 2020, from U.S. Appl. No. 16/031,945, filed Apr. 24, 2020, 15 pp.

U.S. Appl. No. 16/746,344, filed Jan. 17, 2020, by Noureddine et al.

U.S. Appl. No. 16/791,957, filed Feb. 14, 2020, by Noureddine et al.

Response to Second Written Opinion dated Nov. 5, 2019, from international application No. PCT/US2018/062117, dated Jan. 3, 2020, 23 pp.

Response to Office Action dated May 1, 2020, from U.S. Appl. No. 16/198,607, filed Aug., 3, 2020, 14 pages.

U.S. Appl. No. 16/939,617, filed Jul. 27, 2020, naming inventors Sindhu et al.

* cited by examiner

WORK UNIT STACK DATA STRUCTURES IN MULTIPLE CORE PROCESSOR SYSTEM FOR STREAM DATA PROCESSING

This application claims the benefit of U.S. Provisional Appl. No. 62/589,427, filed Nov. 21, 2017, the entire content of which is incorporated herein by reference.

TECHNICAL FIELD

The invention relates to processing packets of information, for example, in the fields of networking and storage.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are always forwarded from the source to the destination along a single path through the routers and switches comprising the switching fabric.

Network devices, e.g., switches, routers, servers or other devices, within a data center may utilize multiple core processor systems to achieve increased performance. However, processing streams of data, such as network packets, with multi-core processing systems can present many programming challenges. For example, it is often difficult to move processing of a packet or set of packets from one core to another, such as for load balancing across the cores. Often, an operating system, such as Linux, Unix or a special-purpose operating system, is used as a control plane for the device, and each core executes software to provide a data plane for packet processing. Generally, a data plane software stack is typically configured on each core to store information about active subroutines and keep track of the execution point to which each active subroutine should return control when it finishes executing. Transitioning program execution from one processing core to another can be difficult and often requires brute force movement or mapping of state, cached data, and other memory pieces associated with the program execution.

SUMMARY

Techniques are described in which a device, such as a network device, is configured to utilize a work unit (WU) stack data structure in a multiple core processor system. As described herein, the WU stack data structure may provide certain technical benefits, such as helping manage an event driven, run-to-completion programming model of an operating system executed by the multiple core processor system. In such systems, an event driven model often requires an execution framework for asynchronously servicing events, which typically means that state, which might otherwise be stored as functional local variables, lives as state outside the programming language stack executed by one or more of the cores. Moreover, run to completion often requires the cumbersome process of dissecting functions and inserting yield points to force the functions to pause execution, thereby allowing other functions to execute. One technical benefit of the WU stack data structure architecture described in this disclosure is to enable use of familiar programming constructs (e.g., call/return and long-lived stack-based variables) within an event-driven execution model so commonly used within network devices.

For example, as described herein, the WU stack, in its most basic form, may be viewed as a stack of continuations used in addition to (not in place of) a typical program stack of the operating system executed by the network device. As described, the techniques herein provide an efficient means for composing program functionality that enables seamless moving of program execution between cores of the multiple core system. A work unit data structure itself is a building block in a WU stack and can be used to compose a processing pipeline and services execution by the multiple core processor system. The WU stack structure flows along with a respective packet and carries state, memory, and other information in auxiliary variables to allow program execution for processing the packet to transition between the cores. In this way, the configuration and arrangement of the WU stack separate from the program stack maintained by the operating system allows program execution to easily be moved between processing cores, thereby facilitating high-speed, event-driven stream processing. A frame structure utilized by the WU stack is maintained in software and can be mapped directly to hardware, such as to particular cores for execution. In certain implementations, the WU stack may be configured to readily provide an exception model for handling abnormal events and a 'success bypass' to shortcut a long series of operations. Further, the WU stack may be used as an arbitrary flow execution model for any combination of pipelined or parallel processing.

In one example, a device comprises a plurality of processing cores, each of the cores configured to execute one or more of a plurality of software work unit handlers (WU handlers), and a memory configured to store a plurality of work units arranged as a work unit stack (WU stack). Each of the work units is associated with a stream data unit (e.g., one or more network packets), and each work unit specifies a particular one of the WU handlers for processing the one or more network packets. Moreover, the WUs in the WU stack may further specify a particular one of the cores for executing the respective WU handler identified by the WU. In one example, at least one of the work units within the WU stack includes an identifier of a second work unit within the WU stack for further processing the network packets upon completion of the work unit.

The plurality of processing cores can be logically arranged in a processing pipelined having a plurality of stages and are configured to execute the plurality of work units (WU) arranged as the WU stack to perform stream processing tasks on the stream data units. For example, a first one of the plurality of processing cores may be configured, as a first one of the stages, to execute a first WU handler specified by a first WU of the WU stack to perform the operations on the portion of the data as identified in the first WU. A second one of the plurality of processing cores may be configured, as a second one of the stages, to execute a second WU handler specified by a second WU of the WU stack for a subsequent processing stage identified in the first WU.

The details of one or more examples are set forth in the accompanying drawings and the description below. Other features, objects, and advantages of the invention will be apparent from the description and drawings, and from the claims.

DETAILED DESCRIPTION

Figure 1A:
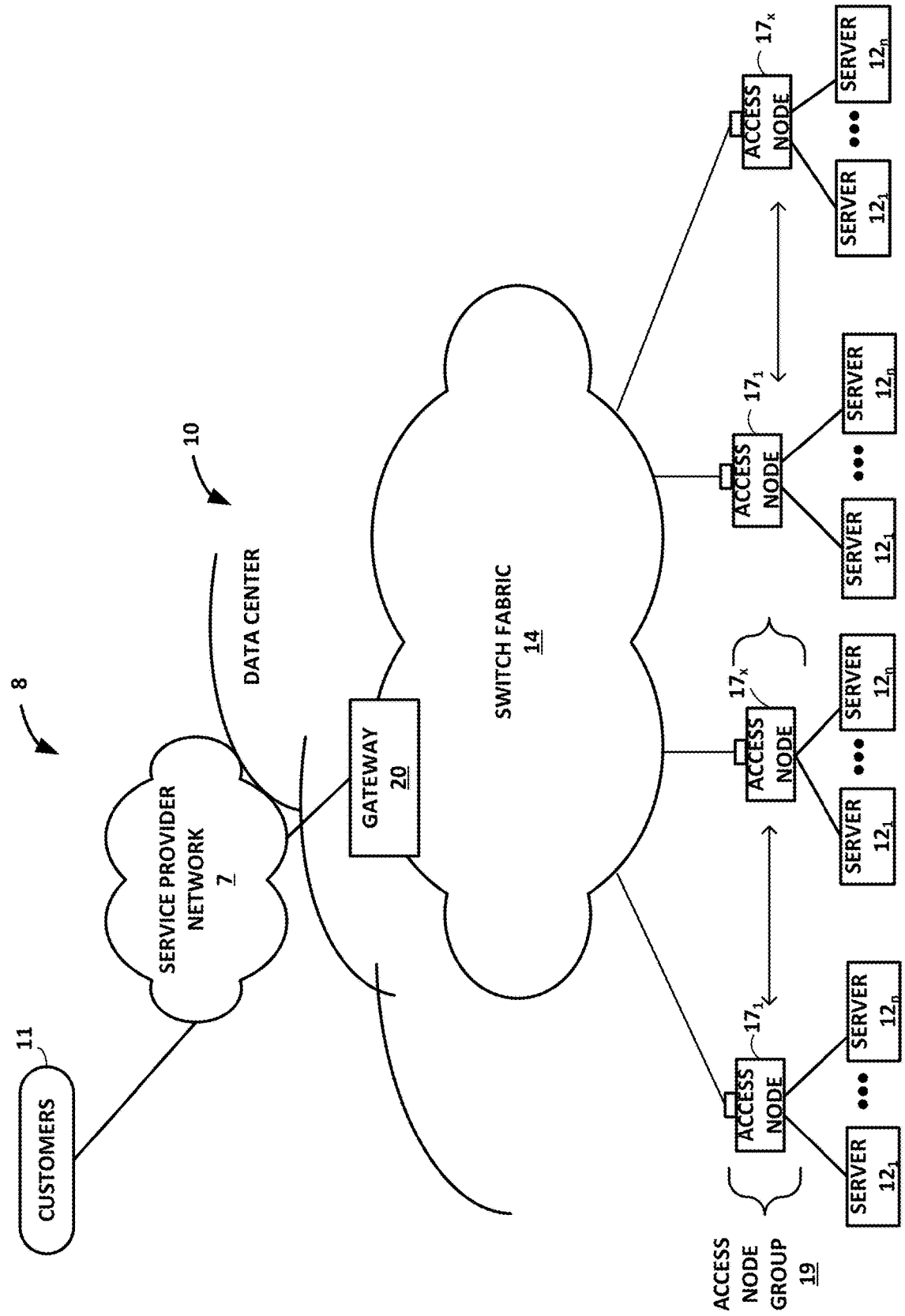
FIG. 1A is a block diagram illustrating an example network in which examples of the techniques described herein may be implemented.

FIG. 1A is a block diagram illustrating an example system 8 that illustrate one or more network devices configured to utilize a work unit (WU) stack data structure in a multiple core processor system. As described herein, the WU stack data structure may provide certain technical benefits, such as helping manage an event driven, run-to-completion programming model of an operating system executed by the multiple core processor system. In the example of FIG. 1A, the WU stack, associated data structures and processing techniques are described with respect to access nodes 17 within a data center 10. Other devices within a network, such as routers, switches, servers, firewalls, gateways and the like, having multiple core processor systems may readily be configured to utilize the WU stack data structures and data processing techniques described herein.

FIG. 1A is a block diagram illustrating an example in which examples of the techniques described herein may be implemented. In this example, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1A, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1A, each of servers 12 is coupled to switch fabric 14 by an access node 17. In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_x$.

As further described herein, in one example, each access node 17 is a highly programmable I/O processor, referred to generally herein as a data processing unit (DPU), specially designed for offloading certain functions from servers 12. Unlike conventional compute models that are centered around a central processing unit (CPU), example implementations described herein leverage a DPU that is specially designed and optimized for a data-centric computing model in which the data processing tasks are centered around, and the primary responsibility of the DPU. The DPU may be viewed as a highly programmable, high-performance input/output (I/O) and data-processing hub designed to aggregate and process network and storage I/O to and from multiple other components and/or devices.

In accordance with example implementations of the techniques of this disclosure, the highly programmable DPU comprises a network interface (e.g., Ethernet) to connect to a network to send and receive stream data units (e.g., data packets), one or more host interfaces (e.g., Peripheral Component Interconnect-Express (PCI-e)) to connect to one or more application processors (e.g., a CPU or a graphics processing unit (GPU)) or storage devices (e.g., solid state drives (SSDs)) to send and receive stream data units, and a multi-core processor with two or more of the processing cores executing a run-to-completion data plane operating system on which a software function is invoked for processing one or more of the stream data units, and with one or more of the processing cores executing a multi-tasking control plane operating system. The data plane operating system comprises a low level, run-to-completion operating system running on bare metal of the DPU that is configured to support software functions for performing data processing tasks. In some examples, the data plane operating system is also configured to support a control plane software stack that includes the multi-tasking control plane operating system (e.g., Linux). The DPU utilizes fine-grain work units, work unit queues, and a queue manager executed on the data plane operating system to serialize packet processing such that data packets of a same packet flow are processed by a same processing core. In this way, the DPU is capable of processing any type of packet flow with fine granularity between processing cores and low processing overhead.

In one example, each access node 17 includes two or more processing cores consisting of a number of internal processor clusters equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Access nodes 17 may also be referred to herein as data processing units (DPUs), or devices including DPUs. In other words, the term access node may be used herein interchangeably with the term DPU. Additional example details of various example access nodes are described in U.S. patent application Ser. No. 16/031,676, filed Jul. 10, 2018, entitled "Access Node for Data Centers," U.S. patent application Ser. No. 16/031,921, filed Jul. 10, 2018, entitled "Data Processing Unit for Computing Devices," and U.S. patent application Ser. No. 16/031,945, filed Jul. 10, 2018, entitled "Data Processing Unit For Stream Processing," the entire contents of each of the applications being incorporated herein by reference.

In the example of FIG. 1A, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the data center network architecture and interconnected access nodes illustrated in FIG. 1A are available in U.S. Provisional Patent Application No. 62/514,583, filed Jun. 2, 2017, and U.S. patent application Ser. No. 15/939,227, filed Mar. 28, 2018, entitled "Non-Blocking Any-to-Any Data Center Network with Packet Spraying Over Multiple Alternate Data Paths," the entire content of each being incorporated herein by reference.

Further, in some embodiments, rather than being limited to flow-based routing and switching, switch fabric 14 may be configured such that access nodes 17 may, for any given packet flow between servers 12, spray the packets of a packet flow across all or a subset of the parallel data paths of switch fabric 14 by which a given destination access node 17 for a destination server 12 can be reached. An access node 17 sourcing a packet flow for a source server 12 may use any technique for spraying the packets across the available parallel data paths, such as random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (five tuple) sourced by a server 12 to traverse different paths of switch fabric 14 between access nodes 17 coupled to the source and destinations servers. The respective destination access node 17 associated with the destination server 12 may be configured to reorder the variable length IP packets of the packet flows and deliver the packets to the destination server in reordered sequence.

In this way, according to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. For example, example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, and U.S. patent application Ser. No. 16/147,070, filed Sep. 28, 2018, entitled "Fabric Control Protocol for Data Center Networks with Packet Spraying Over Multiple Alternate Data Paths," the entire content of which is incorporated herein by reference.

Two example architectures of access nodes 17 are described below with respect to FIG. 2 and FIGS. 3, 4A, and 4B. With respect to either example, the architecture of each access node 17 comprises a multiple core processor system that represents a high performance, hyper-converged network, storage, and data processor and input/output hub. The architecture of each access node 17 is optimized for high performance and high efficiency stream processing.

A stream is defined as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments; each stream fragment including a memory block contiguously addressable in physical address space, an offset into that block, and a valid length. Streams can be discrete, such as a sequence of packets received from a network, or continuous, such as a stream of bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access units 17 can safely access different windows within the stream.

As described herein, processing of stream information may be associated with a "work unit." A work unit (WU) is, in one example, a container that is associated with a stream state and used to describe (i.e. point to) data within a stream (stored in memory) along with any associated meta-data and operations to be performed on the data. In the example of FIG. 1A, work units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. The work unit is associated with an amount of work that is relevant to the entity executing the work unit for processing a respective portion of a stream.

Stream processing is typically initiated as a result of receiving one or more work units associated respective portions of the stream. In protocol processing, a portion would be a single buffer (e.g. packet). Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

As described herein, the techniques of this disclosure introduce a new data structure, referred to as a work unit (WU) stack, for use in a multiple core processor system, such as any of access nodes 17. Access nodes 17 may, for example, be configured to operate using the WU stack data structure, which may provide the technical benefit of helping to more readily manage and utilize an event driven, run-to-completion programming model of an operating system executed by any of access nodes 17. In such systems, an event driven model often requires an execution framework for asynchronously servicing events at high rates, which typically means that state, which might otherwise be stored as functional local variables, lives as state outside the programming language stack executed by one or more of the cores of access nodes 17. Moreover, run to completion execution model typically requires functions to be dissected for insertion of yield points. One technical benefit of the WU stack data structure architecture described in this disclosure is to enable use of familiar programming constructs (e.g., call/return and long-lived stack-based variables) within an event-driven execution model so commonly used within network devices.

For purposes of example, each access node 17 may execute an operating system, such as a general-purpose operating system (e.g., Linux or Unix) or a special-purpose operating system, that provides an execution environment for data plane software for data processing. The WU stack, in its most basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

Although access nodes 17 are described in FIG. 1A with respect to switch fabric 14 of data center 10, in other examples, access nodes and the WU stack functionality described herein may operate within any packet-switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and reorder the packets for delivery to the destinations so as to provide full mesh connectivity.

Figure 1B:
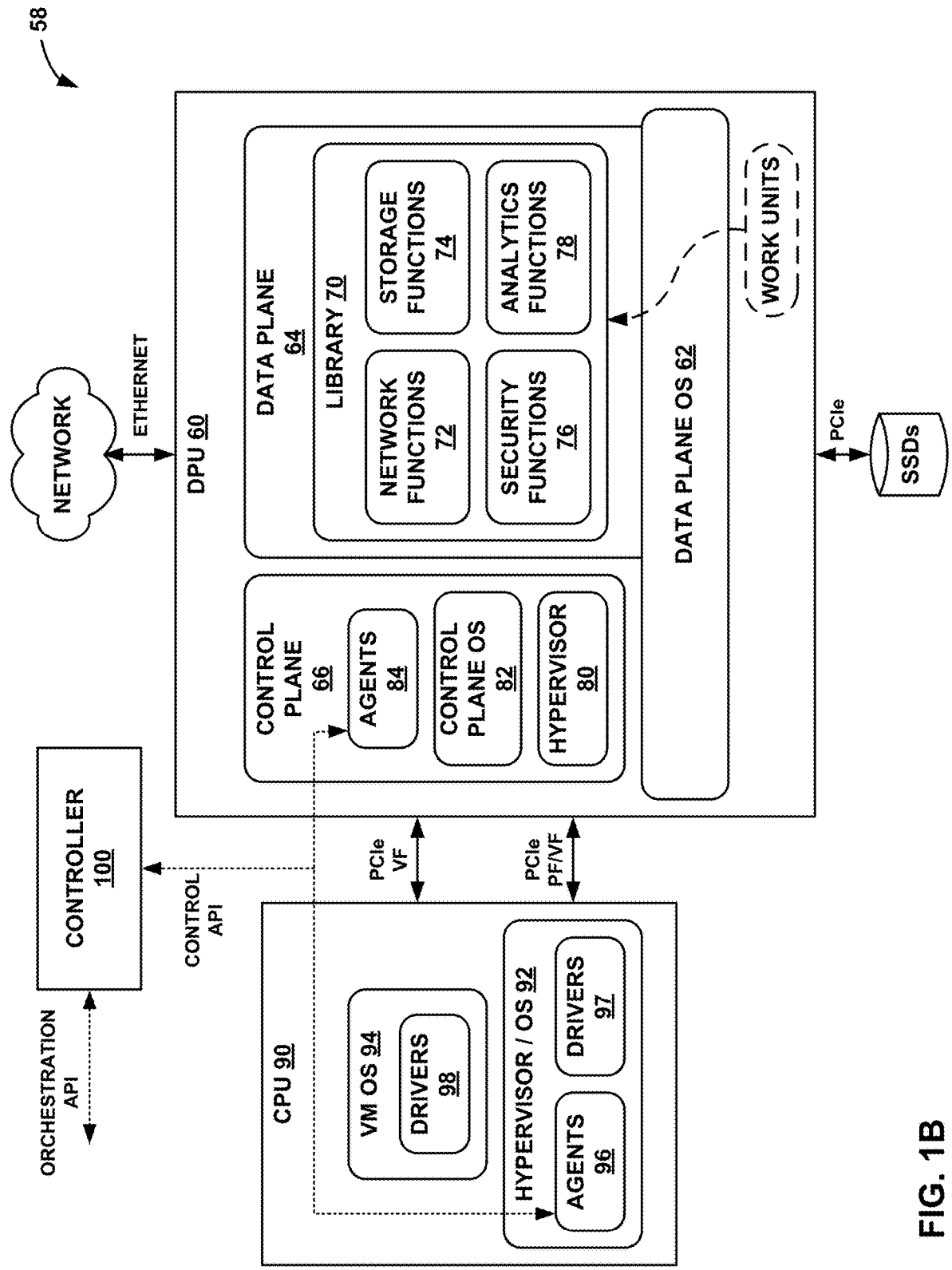
FIG. 1B is a block diagram illustrating a system having an example data processing unit including a run-to-completion data plane operating system configured to process work units, in accordance with the techniques of this disclosure.

FIG. 1B is a block diagram illustrating a system 58 having a data processing unit (DPU) 60 including a run-to-completion data plane operating system (OS) 62 configured to process work units, in accordance with the techniques of this disclosure. In the illustrated example of FIG. 1B, system 58 also includes CPU 90 communicatively coupled to DPU 60. Each of DPU 60 and CPU 90 generally represents a hardware chip implemented in digital logic circuitry. In some examples, DPU 60 and CPU 90 may be hosted on the same computing device.

DPU 60 is a highly programmable I/O processor with a plurality of processing cores (as discussed below, e.g., with respect to FIG. 3). In the illustrated example of FIG. 1B, DPU 60 includes a network interface (e.g., an Ethernet interface) to connect directly to a network, and a plurality of host interfaces (e.g., PCI-e interfaces) to connect directly to one or more application processors (e.g., CPU 90) and one or more storage devices (e.g., SSDs). DPU 60 also includes a run-to-completion data plane operating system (OS) 62 executing on two or more of the plurality of processing cores. Data plane OS 62 provides data plane 64 as an execution environment for a run-to-completion software function invoked on data plane OS 62 to execute a "work unit". As described herein, each work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 70 provided by data plane OS 62. In the illustrated example, library 70 includes network functions 72, storage functions 74, security functions 76, and analytics functions 78. Network functions 72 may, for example, include network I/O data processing functions related to Ethernet, network overlays, networking protocols, encryption, and firewalls. Storage functions 74 may, for example, include storage I/O data processing functions related to NVME (non-volatile memory express), compression, encryption, replication, erasure coding, and pooling. Security functions 76 may, for example, include security data processing functions related to encryption, regular expression processing, and hash processing. Analytics functions 78 may, for example, include analytical data processing functions related to a customizable pipeline of data transformations.

In general, data plane OS 62 is a low level, run-to-completion operating system running on bare metal of DPU 62 that runs hardware threads for data processing and manages work units. As described in more detail below, data plane OS 62 includes the logic of a queue manager to manage work unit interfaces, enqueue and dequeue work units from queues, and invoke a software function specified by a work unit on a processing core specified by the work unit. In the run-to-completion programming model, data plane OS 62 is configured to dequeue a work unit from a queue, process the work unit on the processing core, and return the results of processing the work unit to the queues.

DPU 60 also includes a multi-tasking control plane operating system executing on one or more of the plurality of processing cores. In some examples, the multi-tasking control plane operating system may comprise Linux, Unix, or a special-purpose operating system. In some examples, as illustrated in FIG. 1B, data plane OS 62 provides a control plane 66 including a control plane software stack executing on data plane OS 62. As illustrated, the control plane software stack includes a hypervisor 80, a multi-tasking control plane OS 82 executing on hypervisor 80, and one or more control plane service agents 84 executing on control plane OS 82. Hypervisor 80 may operate to isolate control plane OS 82 from the work unit and data processing performed on data plane OS 62.

Control plane service agents 84 executing on control plane OS 82 represent application-level software configured to perform set up and tear down of software structures to support work unit processing performed by the software functions executing on data plane OS 62. In the example of data packet processing, control plane service agents 84 are configured to set up the packet flow for data packet processing by the software function on data plane OS 62, and tear down the packet flow once the packet processing is complete. In this way, DPU 60 comprises a highly programmable processor that can run application-level processing while leveraging the underlying work unit data structure for highly parallelized stream processing.

As one example, in accordance with the techniques described herein, to set up the software structures for processing one or more streams of data (e.g., packet flows) the application-level software executing on control plane OS 82 may construct work units (WUs) arranged in a stack within memory. Each of the work units in the WU stack is associated with a stream data unit (e.g., one or more network packets), and each work unit specifies a particular one of the WU handlers (i.e., a respective function of library 70 to be executed on run-to-completion data plane OS 62) for processing the one or more network packets. Moreover, the WUs in the WU stack may further specify a particular one of the cores for executing the respective WU handler identified by the WU. In one example, at least one of the work units within the WU stack includes an identifier of a second work unit within the WU stack for further processing the network packets upon completion of the work unit.

In this way, the WU stack constructed by the application-level software executing on control plane OS 82 can be constructed to logically define, for a given one or more streams of data, the processing cores into a processing pipeline having a plurality of stages that are configured to execute the plurality of work units (WU) arranged as the WU stack to perform stream processing tasks on the stream data units. For example, a first one of the plurality of processing cores may be configured, as a first one of the stages, to execute a first WU handler specified by a first WU of the WU stack to perform the operations on the portion of the data as identified in the first WU. A second one of the plurality of processing cores may be configured, as a second one of the stages, to execute a second WU handler specified by a second WU of the WU stack for a subsequent processing stage identified in the first WU.

In some example implementations, instead of running on top of data plane OS 62, the multi-tasking control plane operating system may run on one or more independent processing cores that are dedicated to the control plane operating system and different than the processing cores executing data plane OS 62. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

CPU 90 is an application processor with one or more processing cores optimized for computing-intensive tasks. In the illustrated example of FIG. 1B, CPU 90 includes a plurality of host interfaces (e.g., PCI-e interfaces) to connect directly to DPU 60. CPU 90 includes a hypervisor/OS 92 that supports one or more service agents 96 and one or more drivers 97. As illustrated in FIG. 1B, CPU 90 may also include a virtual machine (VM) OS 94 executing on top of hypervisor/OS 92 that supports one or more drivers 98. Application level software, such as agents 96 or drivers 97 executing on OS 92 or drivers 98 executing on VM OS 94, of CPU 90 may determine which data processing tasks to offload from CPU 90 to DPU 60. For example, hypervisor/OS 92 of CPU 90 may offload data processing tasks to DPU 60 using physical functions (PFs) and/or virtual functions (VFs) of PCIe links. VM OS 94 of CPU 90 may offload data processing tasks to DPU 60 using VFs of PCIe links.

In the illustrated example of FIG. 1B, system 58 also includes a controller 100 in communication with both DPU 60 and CPU 90 via a control application programming interface (API). Controller 100 may provide a high-level controller for configuring and managing application level software executing on a control plane operating system of each of DPU 60 and CPU 90. For example, controller 100 may configure and manage which data processing tasks are to be offloaded from CPU 90 to DPU 60. In some examples, controller 100 may comprise a software-defined networking (SDN) controller, which may operate substantially similar to controller 18 of FIG. 1A. In some examples, controller 100 may operate in response to configuration input received from a network administrator via an orchestration API.

In this example, data plane OS 62 of DPU 60 is configured to receive stream data units for processing on behalf of the application-level software executing on hypervisor/OS 92 of CPU 90. In the example of packet processing, the stream data units may comprise data packets of packet flows. In this example, the received packet flows may include any of networking packet flows, storage packet flows, security packet flow, analytics packet flows, or any combination thereof. Data plane OS 62 executing on one of the processing cores of DPU 60 may receive each of the packet flows from a networking unit, host unit, or another one of the processing cores (as discussed below, e.g., with respect to FIG. 3) of DPU 60. Each of the work units for a received packet flow may be associated with one or more data packets of the packet flow. Upon receipt of the packet flow, data plane OS 62 performs a lookup in a flow table to determine that the packet flow is legitimate, and may map the packet flow to one or more of the processing cores of DPU 60 for serialized processing of the packets of the packet flow. The flow table may comprise a hardware implemented flow table that is updated and maintained with legitimate packet flows by control plane 66, and used to assign processing cores to packet flows.

In the case where the received packet flow is not recognized by data plane OS 62, e.g., the packet flow is not yet set up in the flow table, data plane OS 62 may send the packet flow through the slow path in control plane 66 for set up. Control plane service agents 84 executing on control plane OS 82 then determine that the packet flow is legitimate, and send an instruction to data plane OS 62 to set up the packet flow in the flow table.

Once the packet flow is set up by control plane service agents 84, data plane OS 62 may assign the packet flow to a particular processing core of DPU 60 that can do stream processing for the packet flow. As one example, data plane OS 62 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 62 also provides interfaces to one or more hardware accelerators of DPU 62 (as discussed below, e.g., with respect to FIG. 3) configured to perform acceleration for various data processing functions. Data plane OS 62 may use the hardware accelerators and WU handlers (software functions) in any combination to process one or more portions of the packet flow by specifying the software functions and/or hardware accelerators within the work units arranged as a work unit (WU) stack. To perform stream processing for the packet flow, like software-based WU handlers, a hardware accelerator is configured to perform one or more hardware commands included in the WU stack as input parameters of the first work unit, and upon completion of the one or more hardware commands, proceed to the subsequent work unit within the WU stack identified by the first work unit.

Figure 2:
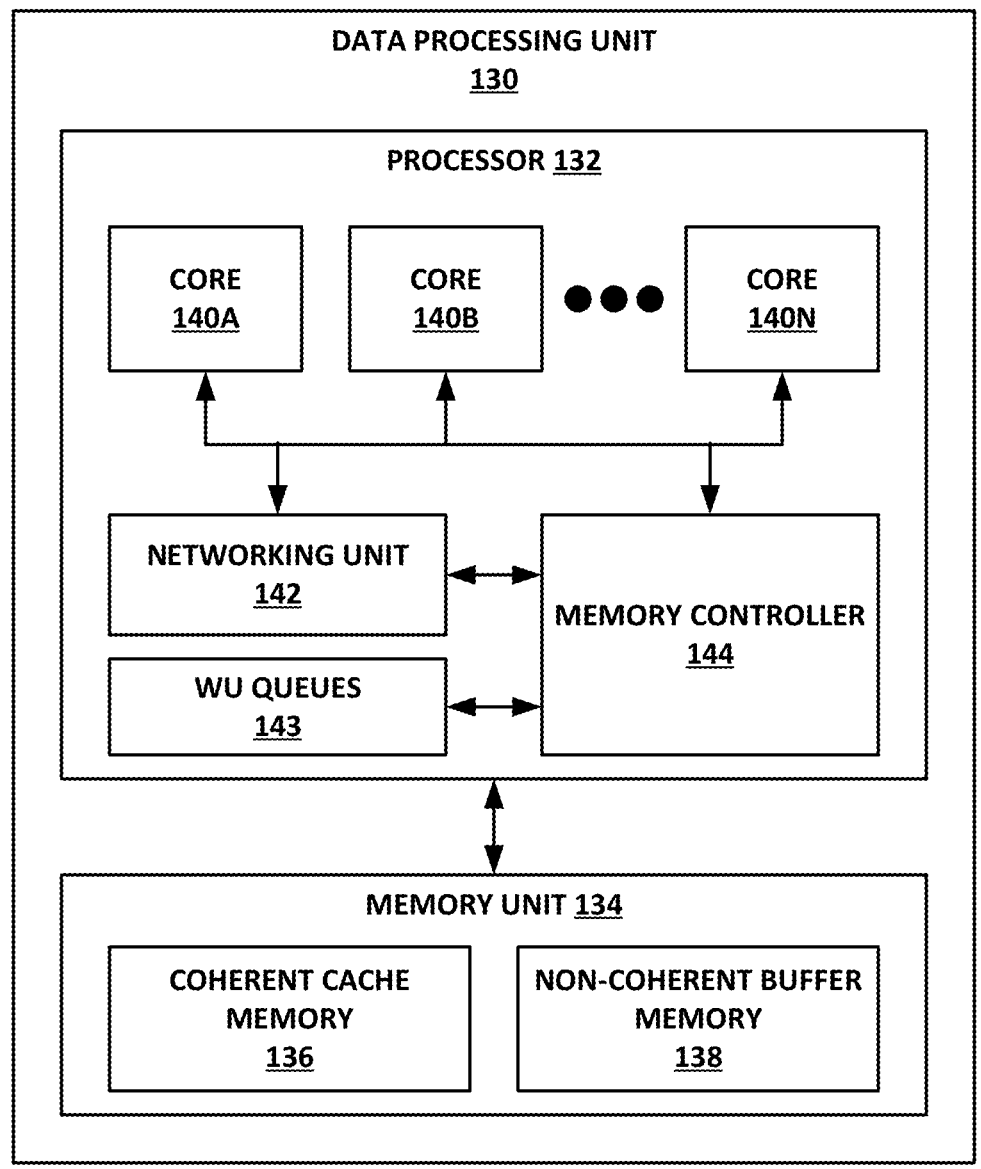
FIG. 2 is a block diagram illustrating hardware components of an example data processing unit including two or more processing cores.

FIG. 2 is a block diagram illustrating an example access node shown as DPU 130 including two or more processing cores. DPU 130 generally represents a hardware chip implemented in digital logic circuitry and may be used in any computing or network device. DPU 130 may operate substantially similar to any of access nodes 17 of FIG. 1A. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media.

In the illustrated example of FIG. 2, DPU 130 includes a multi-core processor 132 having a plurality of programmable processing cores 140A-140N ("cores 140") coupled to an on-chip memory unit 134. Memory unit 134 may include two types of memory or memory devices, namely coherent cache memory 136 and non-coherent buffer memory 138. Processor 132 also includes a networking unit 142, work unit (WU) queues 143, and a memory controller 144. As illustrated in FIG. 2, each of cores 140, networking unit 142, WU queues 143, memory controller 144, and memory unit 134 are communicatively coupled to each other. In some examples, processor 132 of DPU 130 further includes one or more accelerators (not shown) configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1A. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," (Attorney Docket No. FUNG-00200/1242-008USP1), the entire content of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data. Work units, including their structure and functionality, are described in more detail below.

Figure 3:
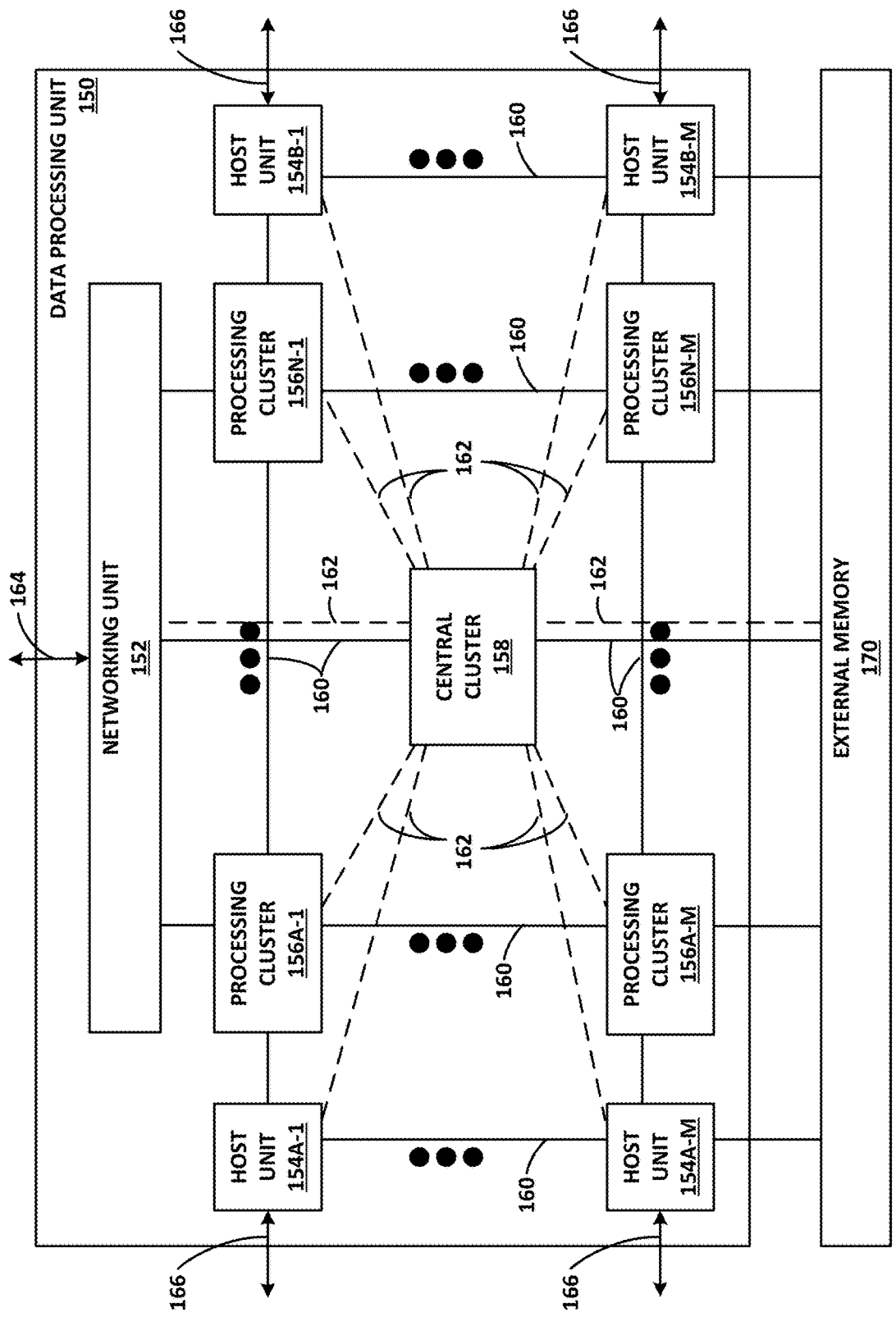
FIG. 3 is a block diagram illustrating hardware components of another example data processing unit including a networking unit, at least one host unit, and two or more processing clusters.

FIG. 3 is a block diagram illustrating one example of a DPU 150 (DPU) including a networking unit, at least one host unit, and two or more processing clusters. DPU 150 may operate substantially similar to any of the access nodes 17 of FIG. 1A. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing device or installed on a card connected to the motherboard of the computing device.

In general, DPU 150 represents a high performance, hyper-converged network, storage, and data processor and input/output hub. As illustrated in FIG. 3, DPU 150 includes networking unit 152, processing clusters 156A-1-156N-M (processing clusters 156), host units 154A-1-154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that provides run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In general, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to eliminate checking overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may represent a fixed length data structure including an action value and one or more arguments. In one example, a work unit includes four words, a first word having a value representing an action value and three additional words each representing an argument. The action value may be considered a work unit header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers. See, for example, FIGS. 6A and 6B as example implementations.

As described herein, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150. An event driven model typically generally means that state, which might otherwise be stored as function local variables, is stored as state outside the programming language stack. Moreover, the run-to-completion model of the underlying operating system also implies that programs would otherwise be forced to dissect software functions to insert yield points to pause execution of the functions and ensure that events are properly serviced. Instead of having to rely on such cumbersome techniques, the work unit stack described herein may enable use familiar programming constructs (call/return, call/continue, long-lived stack-based variables) within the event-driven execution model provided by the underlying operating system of DPU 150 without necessarily having to resort relying on cumbersome yield points. Moreover, the configuration and arrangement of the WU stack separate from the program stack maintained by the operating system allows execution according to a program stack to easily flow between processing cores, thereby facilitating high-speed, event-driven processing, such as stream processing, even using a run-to-completion model provided by an underlying operating system. Work units and work unit stacks are described in more detail below with respect to FIGS. 6A-20.

Figure 4A:
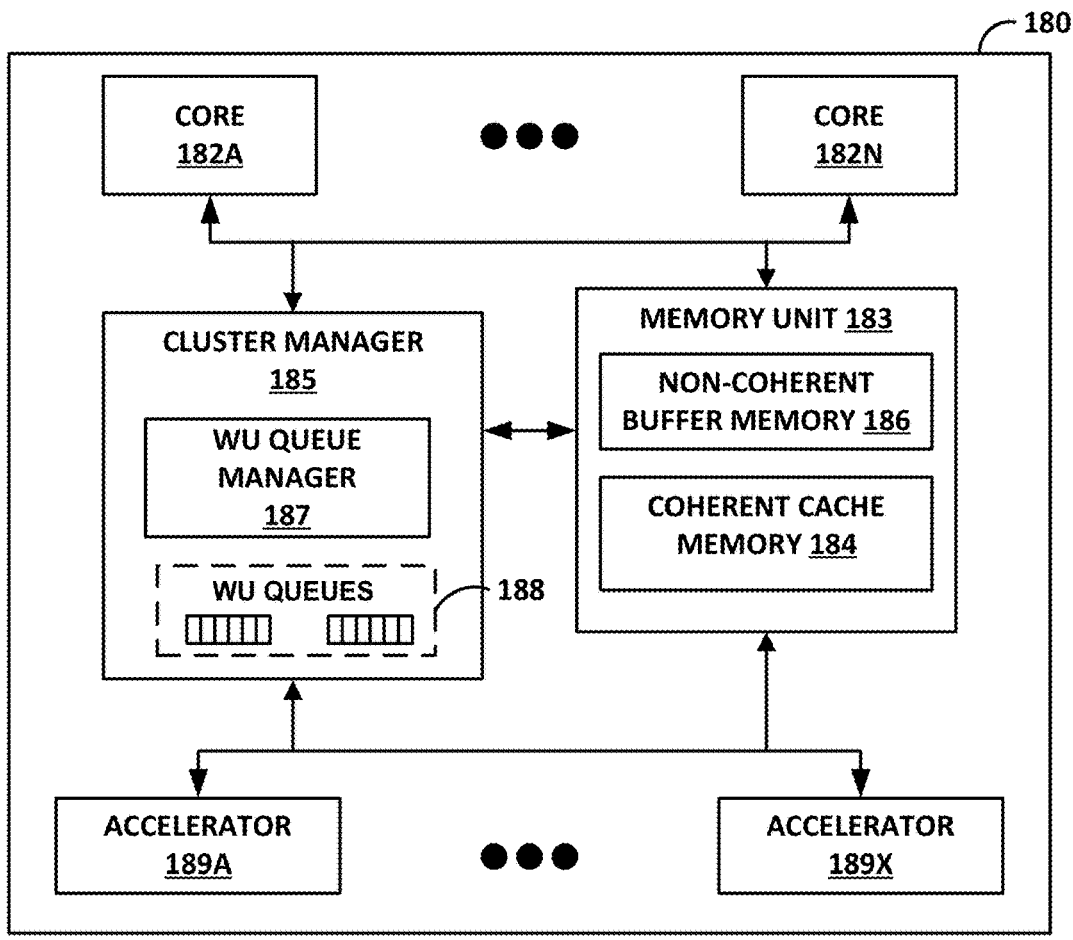
FIG. 4A is a block diagram illustrating an example processing cluster including two or more processing cores.

FIG. 4A is a block diagram illustrating an example processing cluster 180 including a plurality of programmable processing cores 182A-182N. Each of processing clusters 156 of DPU 150 of FIG. 3 may be configured in a manner substantially similar to that shown in FIG. 4A. In this example, processing cluster 180 includes cores 182A-182N ("cores 182"), a memory unit 183 including a coherent cache memory 184 and a non-coherent buffer memory 186, a cluster manager 185 including WU queue manager 187 for maintaining and manipulating WU queues 188, and accelerators 189A-189X ("accelerators 189"). In one example, WU queues 188 are maintained within hardware registers of central cluster 158.

An access node (such as DPU 130 of FIG. 2 or DPU 150 of FIG. 3) may support two distinct memory systems: a coherent memory system and a non-coherent buffer memory system. In the example of FIG. 4A, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as look-ups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the access node, which forwards the work unit to be queued in a virtual processor queue of WU queues 188.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A, which processes the work unit, i.e., performs the work associated with the work unit. The virtual processor then outputs corresponding results (possibly including one or more work unit messages) from performance of the work unit back through the interface unit of core 182A.

Figure 4B:
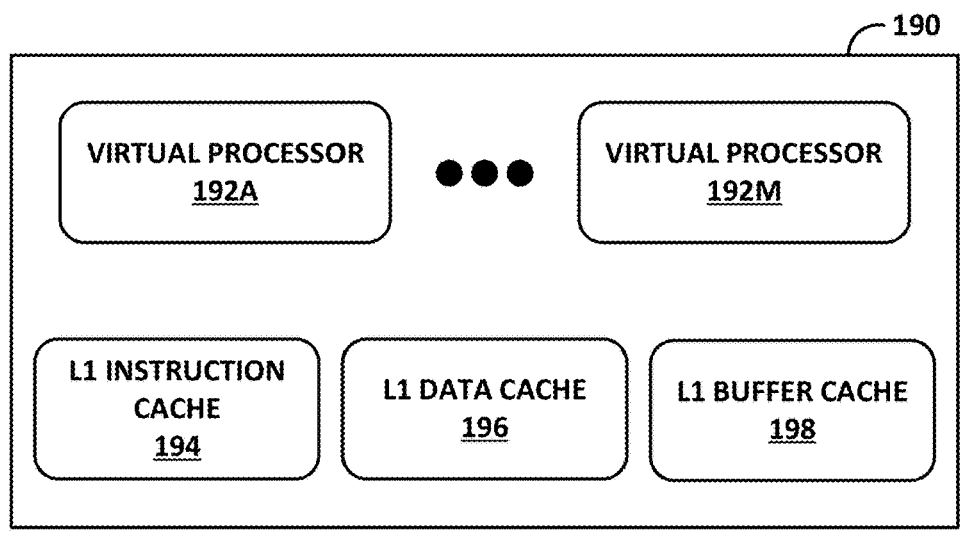
FIG. 4B is a block diagram illustrating an example processing core of a processing cluster.

FIG. 4B is a block diagram illustrating components of an example programmable processing core 190 of a processing cluster. Each of cores 182 of FIG. 4A may include components substantially similar to those of core 190 of FIG. 4B. In this example, core 190 is configured with one or more hardware threads referred to as Virtual Processors (VPs) 192A-192M ("VPs 192"). Core 190 also includes a level 1 (L1) instruction cache 194 and a L1 data cache 196. When each of cores 182 of FIG. 4A includes an L1 data cache similar to L1 data cache 196, the L1 data caches of cores 182 may share L2 coherent cache memory 184 of FIG. 4A. Core 190 also includes a L1 buffer cache 198, which may be smaller than L1 data cache 196. Core 190 may use L1 buffer cache 198 for non-coherent data, such as packets or other data for software managed through the stream processing mode. L1 buffer cache 198 may store data for short-term caching, such that the data is available for fast access. When one of virtual processors 192, such as virtual processor 192A, accesses memory, virtual processor 192A uses L1 data cache 196 or L1 buffer cache 198, based on the physical memory address issued by a memory management unit (not shown).

More details on access nodes, including their operation and example architectures, are available in U.S. Provisional Patent Application No. 62/530,591, filed Jul. 10, 2017, entitled "Data Processing Unit for Computing Devices," (Attorney Docket No. 1242-004USP1), and U.S. Provisional Patent Application No. 62/559,021, filed Sep. 15, 2017, entitled "Access Node for Data Centers," (Attorney Docket No. 1242-005USP1), the entire content of each of which is incorporated herein by reference.

Figure 5:
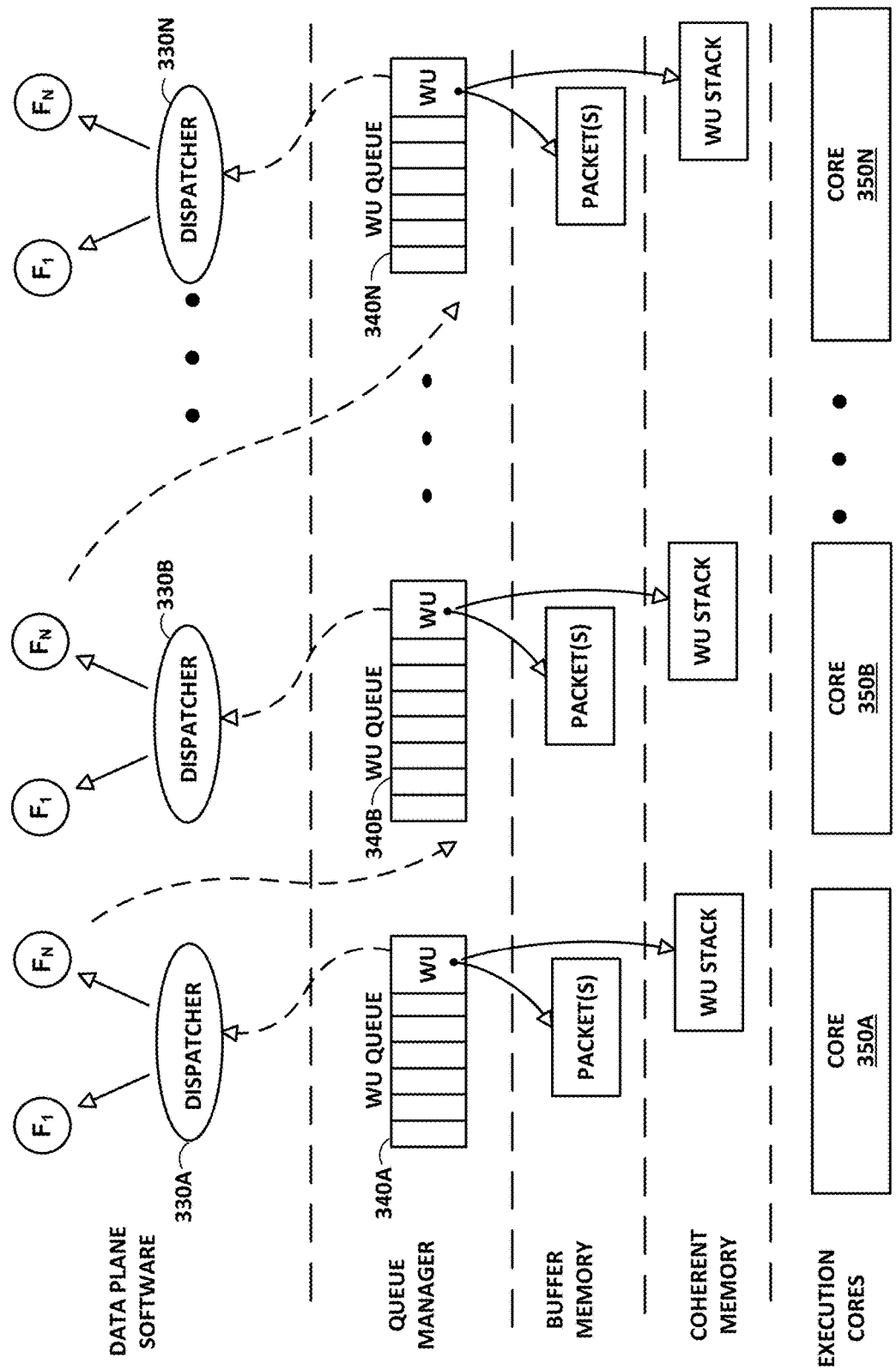
FIG. 5 is a flow diagram illustrating an example pipeline processing flow for processing stream data, such as packets, using work units.

FIG. 5 is a flow diagram illustrating an example pipeline processing flow for processing stream data, such as packets, within a multiple core processor system. FIG. 5 illustrates examples of multiple processing cores 350A-350N (which may correspond to cores 182 of FIG. 4A and include components similar to core 190 of FIG. 4B), non-coherent buffer memory (which may correspond to non-coherent buffer memory 186 of FIG. 4A and/or data stored off-chip, e.g., in external memory 170 of FIG. 3), and coherent memory (which may correspond to coherent cache memory 184 of FIG. 4A and/or data stored off-chip, e.g., in external memory 170 of FIG. 3). Moreover, as shown in FIG. 5, each core 350 is associated with a queue of work units 340 (which may correspond to WU queues 143) to be processed by the core. WU queues 340 may, as one example, be hardware queues maintained by WU queue manager 187 of FIG. 4A.

As shown in FIG. 5, each core 350 executes data plane software for processing stream data, such as packets. In this example, each core 350 provides an execution environment for a set of software functions, shown generally as F1-Fn, also referred to herein as event handlers or WU handlers. In some example implementations, each software function may be programmed in accordance with a run-to-completion programming model for applying one or more operations on stream data. Moreover, the various software functions may represent different, discrete code portions for performing higher-level operations on a packet. For example, a group of software functions may, when chained together for processing a common one or more work units, perform a high-level operation, such as encryption, authentication, deep-packet inspection, and the like. Each individual software function in the group may represent a different, run-to-completion code portion of the overall operation to be performed, and the software functions for the group may be executed on the same or different cores 350.

As shown in the example of FIG. 5, each processing core 350 executes a corresponding one of dispatchers 330A-330N that services the respective WU queue 340 to be processed by the core. Each dispatcher 330 accesses the respective WU queue 340 for its core and, based on data structures within the work unit at the head of the queue, instantiates an instance of a software function (F) for processing the work unit.

As described herein, each work unit within WU queues 340 is associated with stream data to be processed by the respective core. In one example each work unit, includes an association with (e.g., a pointer to) one or more packets and may also include an association with (e.g., a pointer to) a work unit stack ("WU stack") that carries program state, cached data and other information needed for program execution when processing the corresponding packet(s). As further described herein, in various example, each work unit within WU queues 340 specifies (e.g., by an identifier or index) a software function F to be instantiated by dispatcher 330 for processing the work unit. In addition, each work unit includes an identifier for the core 350 or other hardware unit that sent the work unit and an identifier of the core 350 or other hardware unit to receive the work unit once processing is complete by the invoked software function F.

Upon instantiation by a dispatcher, the invoked software function F effectively provides seamless program execution to operate on the packet data associated with the work unit using the program state, cached data and other information specified within the corresponding WU stack. During execution, the software function F may, for example, execute as a run-to-completion event handler for performing one or more particular operations on the stream data. Moreover, continuity of program execution is maintained via the program state and cached data carried by the corresponding WU stack. While processing the work unit, the software function F may further manipulate the corresponding WU stack associated with the particular stream data object, e.g., packet, by performing stack-like operations on the WU stack for the packet and, optionally, directing the queue manager to create additional work units for further processing the packet.

As further described herein, when processing a work unit, the corresponding instance of the software function F invoked by the dispatcher may perform stack-like operations on the WU stack flowing along with the packet in the processing pipeline. In other words, the WU stack may be viewed as a set of work units that collectively implement an overall logical function, where the work units have not been yet been enqueued for processing. The work units are arranged in the WU stack in a stack format and may be manipulated (inserted, removed, etc.) by software functions F using stack operations to specify future work units for the overall logical function. The software function F may, for example, access a current frame within the WU stack for program state, cached data and any input or output variables for performing the corresponding function on the packet. In addition, the software function may effectively 'pop' the current frame from the WU stack, push additional work unit frames on the WU stack, and/or cause additional work units to be created and enqueued within WU queues 340 for performing additional code portions (functions) on the work unit. In this way, the WU stack may be used to facilitate program execution and pipelining of an overall logical function using multiple software functions, where it is undesirable to execute all operations in a single run-to-completion event on a single core.

The following illustrates an example application programming interface (API) that may be utilized by software functions (F) for interacting with and manipulating the WU stacks associated with stream data (e.g., packets) being processed by the multiple processing cores. As seen in this example, a software function (F) can manipulate a WU stack by performing stack-like operations, such as allocating a WU stack, freeing a WU stack, pushing new frames onto an existing WU stack. In addition, as shown below, the API further allows a software function to send a continuation in association with a specific frame pushed on a WU stack, which in turn causes a work unit having a pointer to the frame to be enqueued in a WU queue for processing. The example API is set forth below:

```
// Send the continuation on the top of stack
extern void ws_send_continuation(struct frame *);
// Push a new item on the stack
extern struct frame *ws_push_continuation(wuid_t, faddr_t dest,
struct frame *, uintptr_t arg1, uintptr_t arg2);
// Free the WU stack
extern void ws_free(struct frame *frame);
```

```
// Allocate a new WU stack
extern struct frame *ws_alloc(void);
// Reserve space on the WU stack to store state void
*ws_malloc_on_stack(struct frame **, size_t);
// Push an exception
extern struct frame *ws_push_exception_continuation(wuid_t, faddr_t
dest, struct frame *frame, uintptr_t arg1);
// Raise an exception
extern void ws_raise_exception(struct frame *);
```

The following example pseudo code illustrates an example software function (WU handler) interacting with the WU stack when processing a work unit. In this example, program code executed within the multi-core device, e.g., a DPU, a WU stack is constructed in memory by the program code to stitch together processing of a first frame of the WU stack using WU handler_A to perform a first operation, processing of a second frame of the WU stack using WU handler_B to perform a second operation, and then processing a third frame of the WU stack using WU handler_C to perform a third operation. Moreover, in this example the entire WU stack is created prior to starting the processing pipeline by performing stack operations to sequentially push the frames in reverse order. Once constructed, the WU stack is available for processing the stream data (e.g., one or more network packets). In this way, program code can easily be developed for constructing complex WU stacks for processing stream data according to the WUs within the WU stack, which may define a multi-stage processing pipeline on the multi-core processing system. The example pseudocode is set forth below:

```
//Allocate a new WU stack for a logical operation of
//performing function A then function B then function C
//on a stream data object, such as a packet
struct frame *frame = ws_alloc( );
// First, push the last function to be performed, which is
// to free (release) this WU stack
frame = ws_push_continuation(WU_FREE_FRAME,
DEST_AUTO, frame, 0, 0);
// Push frame for performing function C
frame = ws_push_continuation(WU_C, destC, frame, arg1, arg2);
// Push frame for performing function B
frame = ws_push_continuation(WU_B, destB, frame, arg1, arg2);
// Push frame for performing function A
frame = ws_push_continuation(WU_A, destA, frame, arg1, arg2);
// Start the pipeline by launching (enqueuing) a work unit in
// association with the most recently pushed frame.
ws_send_continuation(frame);
```

Once the WU stack is created, the processing pipeline is initiated by sending a continuation in association with the most recently pushed frame, thus causing a work unit to be enqueued having a pointer to the top frame of the WU stack. At this point, processing of the stream data by the multi-core processing device according to the processing pipeline commences and, when the work unit reaches the head of the WU queue in which it was queued, the dispatcher for the core instantiates an instance of WU handler_A for performing the first operation. After performing the operation and prior to termination, WU handler_A initiates the next stage in the processing pipeline by sending a continuation in association with the next frame of the WU stack (now the top frame), thus causing a second work unit to be enqueued, where this work unit has a pointer to the second frame that was originally pushed to the WU stack. The processing pipeline continues in this manner so as to execute WU handler_B and then, in like manner, WU handler_C, which completes the example processing pipeline. In this way, program code can easily be developed for execution on an event-driven control plane 66 (as a programmer would be used to) for constructing a WU stack for performing complex run-to-completion operations on stream data according to the work units arranged in the stack, which may arranged to define a multi-stage processing pipeline across cores of a multi-core processing device, using software-based WU handler and/or hardware-based accelerators in a run-to-completion data plane 64.

Figure 6A:
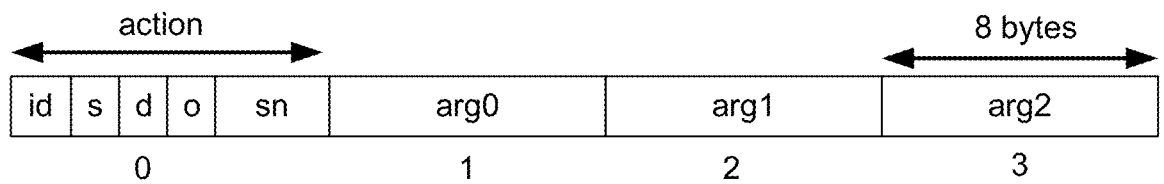
FIG. 6A is a conceptual diagram illustrating an example untyped work unit (WU) binary format.

FIG. 6A is a conceptual diagram illustrating an example untyped work unit (WU) binary format. In the example illustrated in FIG. 6A, the WU is 32 bytes and composed of four 64-bit (8-byte) words, an action and three arguments (arg0, arg1, arg2). As illustrated, the action field is further subdivided into an identifier (id), source (s), destination (d), and opcode (o) fields, as well as signaling network (sn) routing information.

In this example, the fields of a WU are defined as follows:

| Field | Width (bits) | Description |
|---|---|---|
| id | 16 | WU handler ID; Index into table of WU functions to dispatch |
| source | 16 | Source ID of the processor or other hardware unit that sent the WU |
| destination | 16 | Destination queue ID of the processor or other hardware unit to receive the WU |
| opcode | 6 | Hint for the WU dispatch engine; Encodes which fields are pointers to be prefetched |
| sn | 10 | SN routing information, if any |
| arg0 | 64 | First argument register |
| arg1 | 64 | Second argument register |
| arg2 | 64 | Third argument register |

Figure 6B:
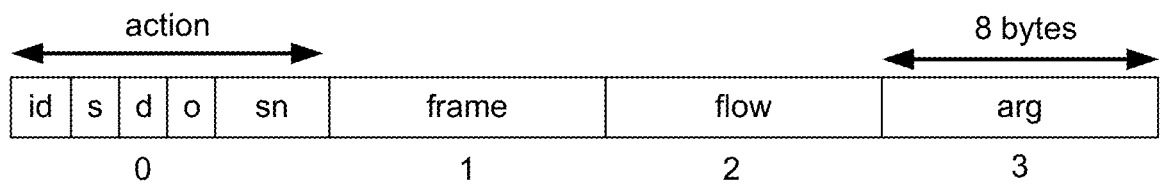
FIG. 6B is a conceptual diagram illustrating an example fully typed work unit (WU) binary format.

FIG. 6B is a conceptual diagram illustrating an example fully typed WU binary format in which each of the WU arguments is typed as a specific pointer used in various WU handlers. In this example, the first argument (arg0) is typed as a frame field to identify the corresponding WU stack for the work unit, the second argument (arg1) is typed as a flow field, and the third argument (arg2) is typed as a packet field to identify the corresponding packet(s) associated with the work unit. The action field remains unchanged. In the illustrated example, the sn routing information is set to 0. Any WU handler may use any or all untyped or typed arguments.

The typed fields of the example WU of FIG. 6B are defined as follows:

| Field | Width (bits) | Description |
|---|---|---|
| frame | 64 | Pointer to a WU stack frame |
| flow | 64 | Pointer to a WU handler state |
| arg/packet | 64 | Input argument/packet pointer for WU handler |

The typed arguments may be placed in specific argument slots to ensure regularity of WU handler typing. For example, to participate in a WU stack, a WU stores a WU stack frame pointer in one of its arguments. In this example, the first argument register (arg0) is typed as the frame argument used to store the WU stack frame pointer. The flow argument is primarily used to identify a prefetch location for data specific to the WU handler. Other pointer types may be placed in any argument of a WU, but if one of the above types is used, it should be placed in the specified WU argument.

Figure 7:
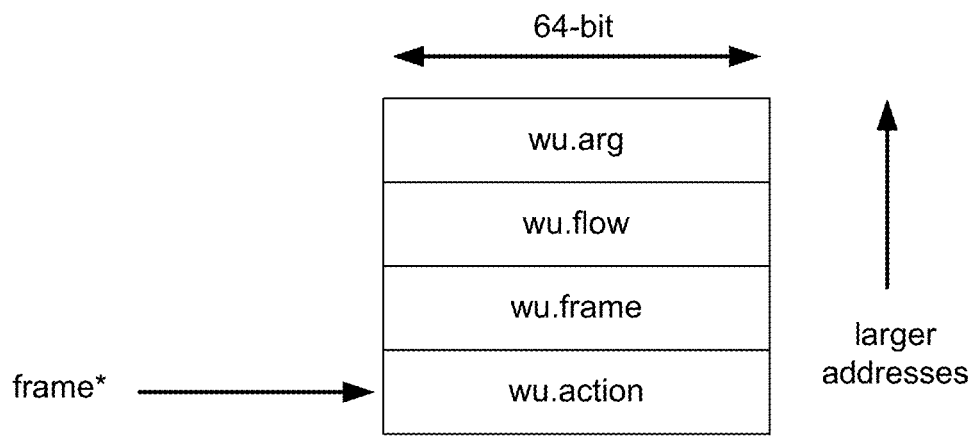
FIG. 7 is a conceptual diagram illustrating an example WU stack frame.

FIG. 7 is a conceptual diagram illustrating an example minimal WU stack frame, i.e., a WU stack, pointed to by a work unit, such as by arg0 of the example work units of FIGS. 6A and 6B. As described herein, the WU stack is a data structure to help manage the event driven, run-to-completion programming model for software functions or event handlers executed by a device (e.g., access nodes 17, 130, or 150), which may be components for processing packets of information within network devices, compute nodes, storage devices and the like.

The example WU stack frame illustrated in FIG. 7 includes each of the 64-bit (8-byte) words of a WU (e.g., wu.action, wu.frame, wu.flow, and wu.arg) arranged in a 64-bit wide stack with larger addresses arranged in ascending order. In its basic form, the WU stack frame is a continuation WU in which a portion of the WU, e.g., the frame argument, is used to identify a subsequent processing stage for the WU once the WU is executed. The WU stack may be used in addition to a typical program stack of the control plane operating system 82 executed by a DPU (or other device) as an efficient means of moving program execution between processing cores for processing stream data. More specifically, the program stack may control code points for execution of computations, while the WU stack helps facilitate flow of the program execution between processing cores. The run-to-completion execution model of the data plane operating system 62 may thus be viewed as an underlying environment for execution of a chain of WU event handlers and/or hardware accelerators making use of the WU stack. To provide dynamic composition of WU handlers, continuations from one handler to the next are resolved at runtime rather than statically. Moreover, a frame pointer argument of a WU handler function points directly to the continuation WU in order to invoke the subsequent handler. This construct may be used to simplify implementation of a number of familiar, higher level semantics, including pipelining and call/return, for the programmer using an event-driven control plane 66 while providing a powerful run-to-completion data plane 64 with specialized WU stack constructs for efficient stream processing.

Figure 8:
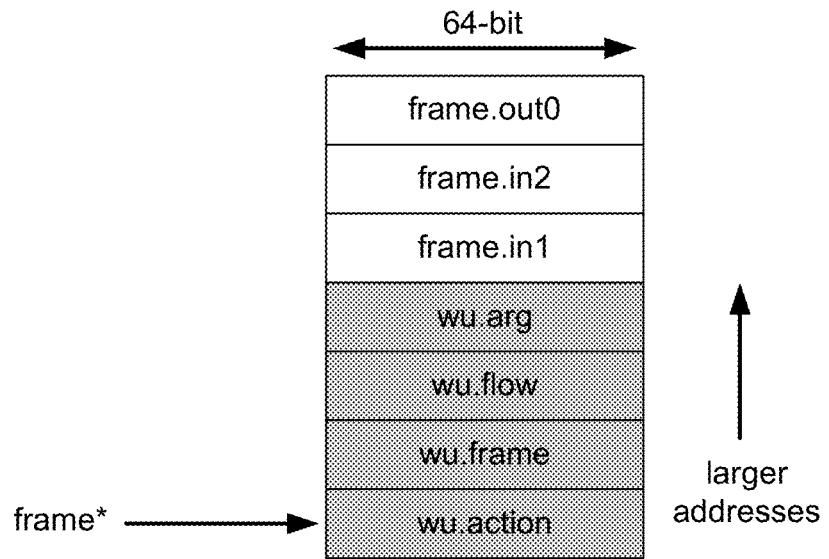
FIG. 8 is a conceptual diagram illustrating an example WU stack frame with input and output parameters.

FIG. 8 is a conceptual diagram illustrating an example WU stack frame having input and output parameters. A WU dispatch is sufficient to invoke an event handler function, however it may also be desirable to provide extra inputs or return outputs from an event handler (software function) tasked with processing the work unit. In one example implementation, the WU stack format provides a common binary format for interoperability between components. As illustrated in FIG. 8, input and output values are placed on the end of the basic continuation WU stack frame. The illustrated example shows a WU stack frame layout for a handler function that takes two 64-bit input values (frame.in1 and frame.in2) and provides a 64-bit output value (frame.out0).

In general, output values are pointers to actual storage locations provided by the processor or hardware device that created the WU stack input frame. These pointers may reference other portions of the same or other WU stacks, including arguments of continuation WUs. It may be desirable to avoid passing output values by overriding continuation WU arguments at WU send time, because it implies knowledge of the continuation WU inputs and thus breaks interposition of handlers. It is also not desirable to write output values directly to the WU stack, unless pointed to by an input argument, in order to ensure WU stacks can be constructed in a read-only fashion.

The example WU stack frame supports an arbitrary number of input and output variables, with no requirement that the number of inputs and outputs of a handler be constant for a given handler. In other words, handlers may support a variable number of parameters or dynamically sized structures/arrays.

Figure 9:
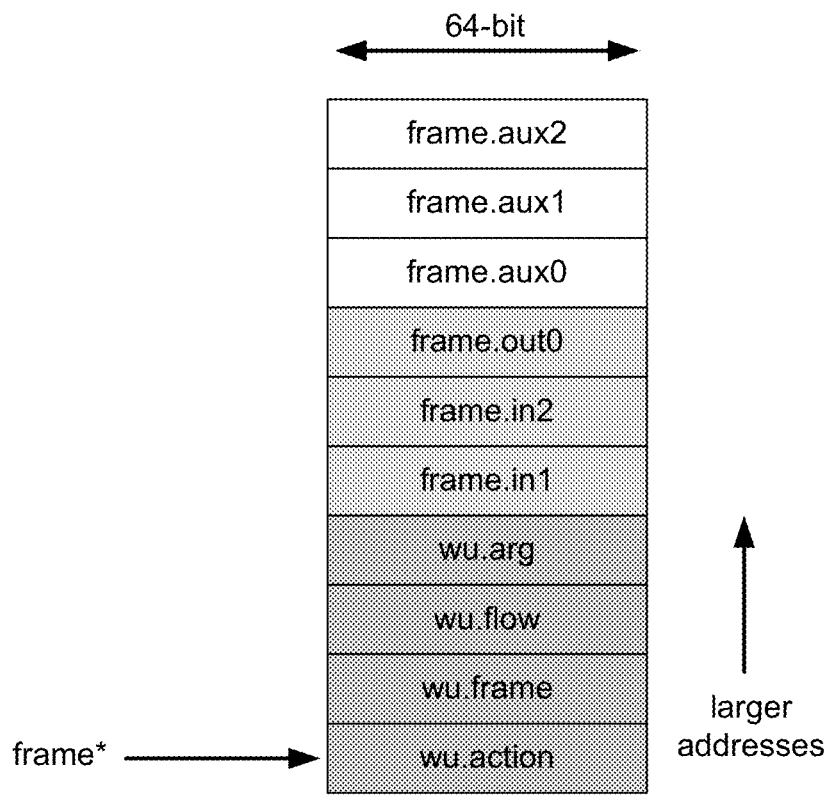
FIG. 9 is a conceptual diagram illustrating an example WU stack frame with auxiliary variables.

FIG. 9 is a conceptual diagram illustrating a more detailed example of a WU stack frame with auxiliary variables in addition to input and output values. In the run-to-completion programming model of the data plane software stack, logical units of work, typically functions, may be decomposed into smaller event handlers. The WU stack may be used to bring the convenience of long-lived stack-based variables to run-to-completion event handler chains, which may seamlessly execute on any of the processing cores. In some examples, a WU handler may increase the size of the current WU stack frame in order to create an arbitrary amount of space for auxiliary storage. As illustrated in FIG. 9, the WU stack frame includes the input and output parameters described with respect to FIG. 8 and includes three auxiliary variables (frame.aux0, frame.aux1, and frame.aux2).

Figure 10:
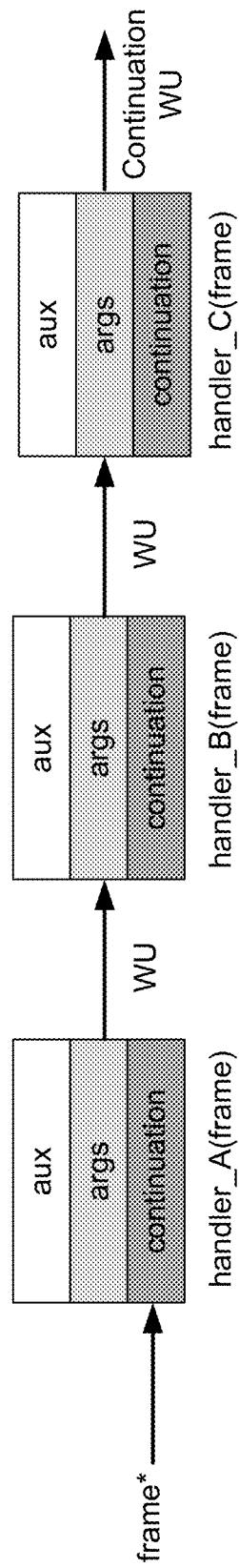
FIG. 10 is a conceptual diagram illustrating an example of WU stack frame pipelining.

FIG. 10 is a conceptual diagram illustrating an example of WU stack frame pipelining. While a single WU handler (software routine/event handler) may operate on a given WU stack at a given time, a single WU stack frame may be re-used multiple times across multiple subsequent WU handler functions. In this way, the WU stack frame may be used for pipelining of a logical function, where it is undesirable to execute all operations in a single run-to-completion event on a single core. In FIG. 10, the WU stack frame is shown in an abbreviated version of the WU stack frame of FIG. 9. For example, "continuation" signifies the basic continuation WU stack frame, "args" signifies any input and/or output arguments included in the WU stack frame, and "aux" signifies any auxiliary variables included in the WU stack frame.

The example illustrated in FIG. 10 shows the execution of multiple WU handlers (handler_A, handler_B, and handler_C) with a single WU stack frame pointer. During execution, each WU handler constructs (i.e., software function F of FIG. 5) and sends a work unit to invoke a WU handler function as the next stage in the processing pipeline, where the next WU handler may be specified on the current core or on a different core. In addition, the WU handler passes the current frame of the WU stack as the WU's frame argument in the newly created work unit. In this way, the current frame continuation WU is not consumed from the WU stack associated with the packet. Further, in this way, the programmatic details implementing the next WU handler in the pipeline are decoupled from the WU stack, e.g., statically or within the flow.

For packet processing, it is common that the same packet pointer (i.e., wu.arg of the WU stack frame) is passed to each stage of the pipeline. In this way, the WU stack frame provides a standard format for pipeline stages to execute on the same data. The last stage of the pipeline uses the continuation WU stored in the frame to dispatch the subsequent event handler, as discussed above with respect to FIG. 7.

Figure 11:
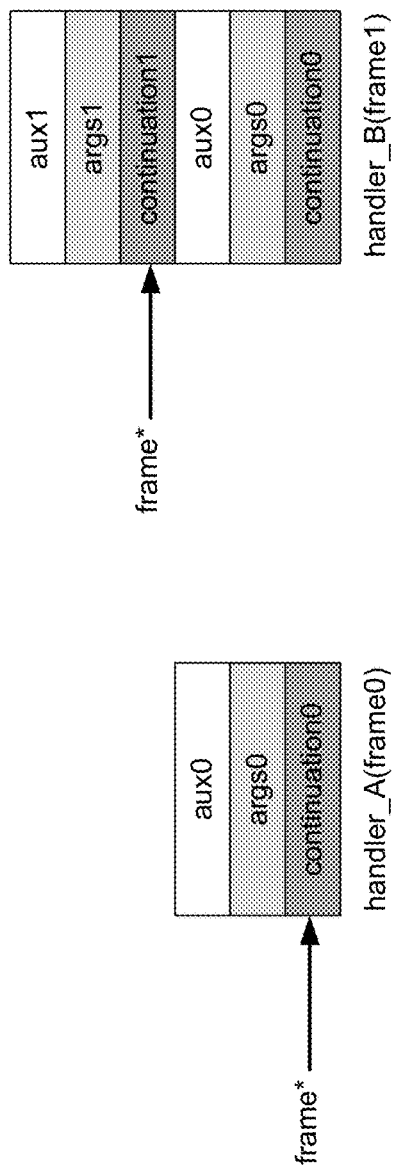
FIG. 11 is a conceptual diagram illustrating an example call on a WU stack.

FIG. 11 is a conceptual diagram illustrating an example call from a WU handler to push an additional WU frame onto a WU stack. Up to this point, WU stacks have only been discussed in terms of the contents of a single stack frame. WU stacks are indeed stacks, so multiple frames may be stacked and manipulated as such by WU handlers in order to easily nest program operations. In other words, from a high level, a WU handler may dispatch another handler with different inputs, while preserving the state of the current WU stack frame.

An abstract example of a nested call is illustrated in FIG. 11. As shown, a WU handler, in this case handler_A, which was invoked on a frame pointer of "frame0," is dispatching another handler, handler_B, with a new set of input arguments. Handler_A pushes a new frame, "frame1," onto its WU stack, filling out the continuation and any input/output arguments for frame1. Handler_A then constructs and sends a new WU for the handler_B function with its frame argument pointing to the frame1 allocation it made on the WU stack. When handler_B completes, directs the queue manager to enqueue the WU referenced by frame1 (i.e., continuation1). This calling construct allows handler_B to execute in a manner where it can modify the argument variables (args1) and auxiliary variables (aux1) in its WU stack frame, (frame1) without modifying the state in handler_A's WU stack frame (frame0). Moreover, in this way the sequence of execution seamlessly flows through handler_A and subsequently handler_B on respective work units even though the underlying execution model of the operating system may be a run-to-completion model and the software event handlers (handler_A and handler_B) may execute on the same core or different cores.

Figure 12:
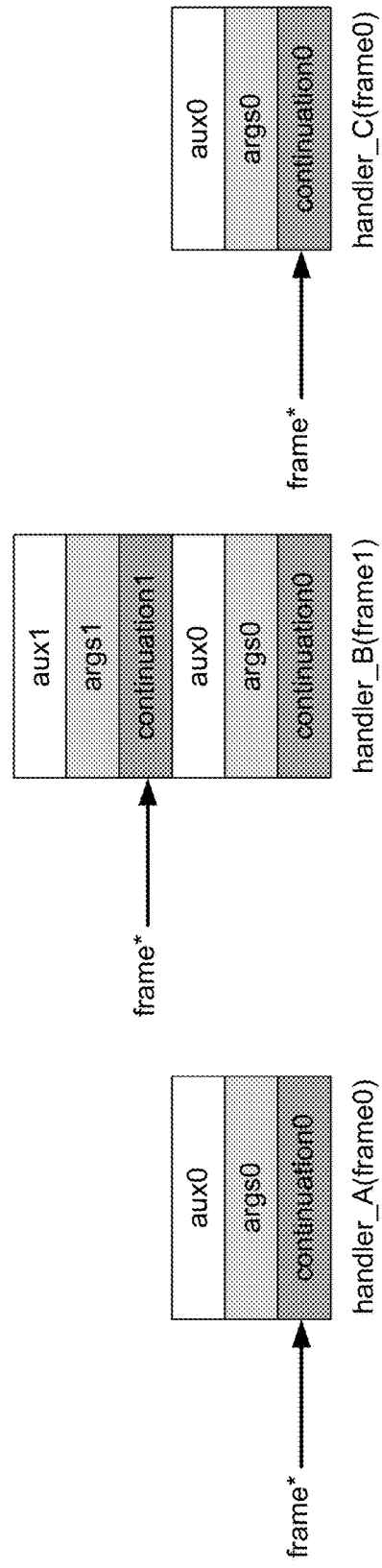
FIG. 12 is a conceptual diagram illustrating an example call and return on a WU stack.

FIG. 12 is a conceptual diagram illustrating an example call and return on a WU stack. Mirroring the call semantics described above with respect to FIG. 11, WU stacks may also express return semantics. An example of the full call/return operation is illustrated in FIG. 12. As shown, handler_A, which was invoked on a frame pointer of frame0, pushes frame1 and its arguments onto the WU stack, and sends a WU to invoke handler_B. Handler_B then sends the WU in continuation1 of frame 1, which executes handler_C on the original frame pointer (frame0).

In the example of FIG. 12, handler_C is invoked from the continuation1 WU of frame 1, which means that handler_A pushed the identity of handler_C when it set up the WU stack frame1 for handler_B. Handler_A and handler_C execute as distinct functions instantiated by a dispatcher, and may execute on different cores, but may be part of the same logical operation. Due to the run-to-completion execution model, there is no way for handler_A to call handler_B and then continue execution in the middle of handler_A. Instead, handler_C is the return handling portion of handler_A, but split out into a different function. The state in args0 and/or aux0 of frame0 is common to handler_A and handler_C, and undisturbed by handler_B such that it is possible to make a logical continuation of handler_A on return to handler_C.

As described above, in some examples, the frame argument (e.g., wu.frame) is just a word in a WU such that it is computationally efficient to unroll the stack from handler_B when continuing to handler_C. The continuation1 WU includes the frame0 pointer, which was placed there when handler_A setup frame1, and is the same frame0 as used by handler_A.

In this way, a run-to-completion programming model may easily be implemented using WU stacks to carry program state, cached data, and input/output values, and to specify continuation points of instruction execution.

Figure 13:
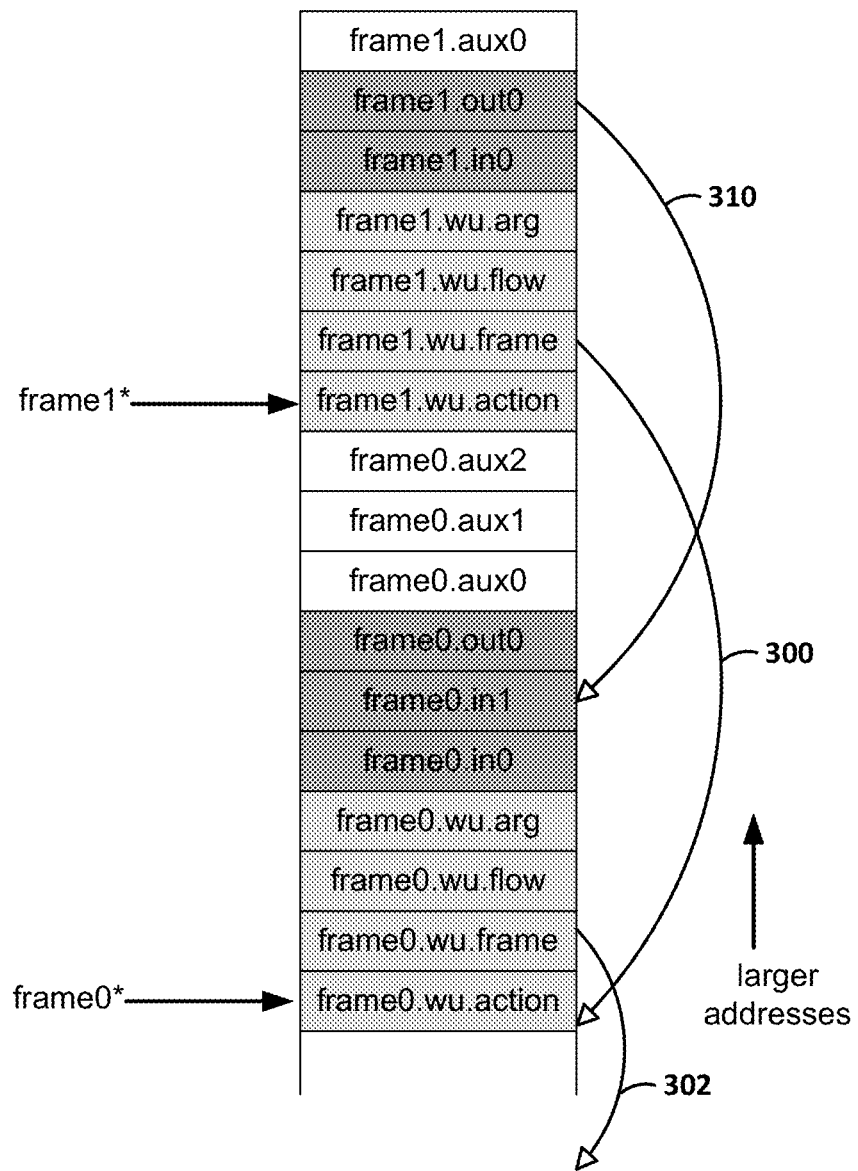
FIG. 13 is a conceptual diagram illustrating an example of WU stack linking.

FIG. 13 is a conceptual diagram illustrating an example of WU stack linking. Each frame pointer points to the continuation WU to send upon completion of the handler (or pipeline of handlers) being invoked on that frame. As illustrated by arrow 300, the frame pointer of frame 1 (frame1.wu.frame) points to the continuation WU of frame 0. Additionally, as illustrated by arrow 302, the frame point of frame 0 (frame0.wu.frame) may point to another continuation WU of a frame lower on the WU stack. Each frame may have an arbitrary number of input/output arguments and auxiliary variable space allocated on the WU stack. One example implementation is that the continuation WU includes the frame pointer of the parent frame, since the final handler of that frame will in effect cause a "return" to the previous frame by sending the continuation WU. In this way, operation on multiple work units can easily be stitched together by manipulating the WU stack.

Figure 14:
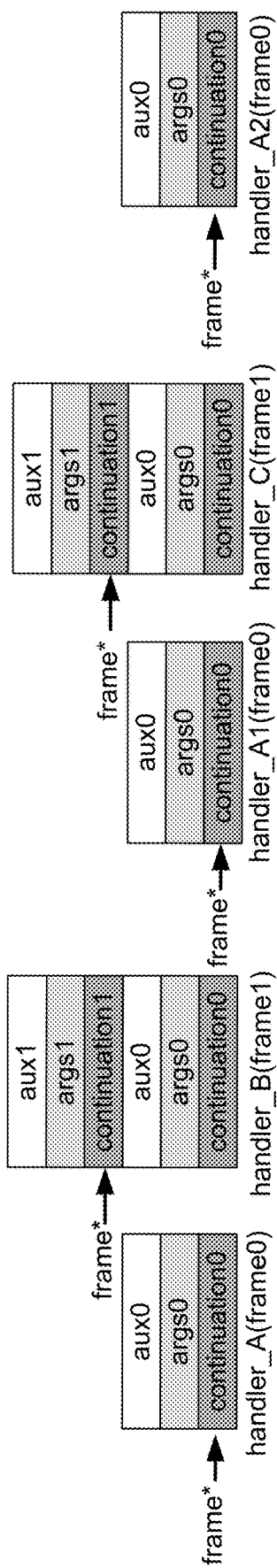
FIG. 14 is a conceptual diagram illustrating an example of sequencing WU handlers.

FIG. 14 is a conceptual diagram illustrating an example of sequencing WU handlers. Beyond the call/return and pipeline semantics described above with respect to FIGS. 10-12, WU stacks may also implement chaining. The example of FIG. 14 illustrates an issue of trying to call a sequence of a series of operations: A, B, and C, in which operations B and C may take some inputs from operation A. In this example, handler_A is invoked on frame 0, and then sets up and dispatches handler_B on frame1. Handler_A is split into handler_A1 to handle the return from handler_B, to then setup the inputs and call to handler_C on frame 1. Handler_C ultimately returns to another portion of handler_A (i.e., handler_A2). This sequencing process is heavy on WUs and rather inefficient if the interactions between the inputs and outputs of the operations are limited. In its simplest form, handler_A1 only exists to send a WU on a frame pointer of frame0, and push frame 1.

Figure 15:
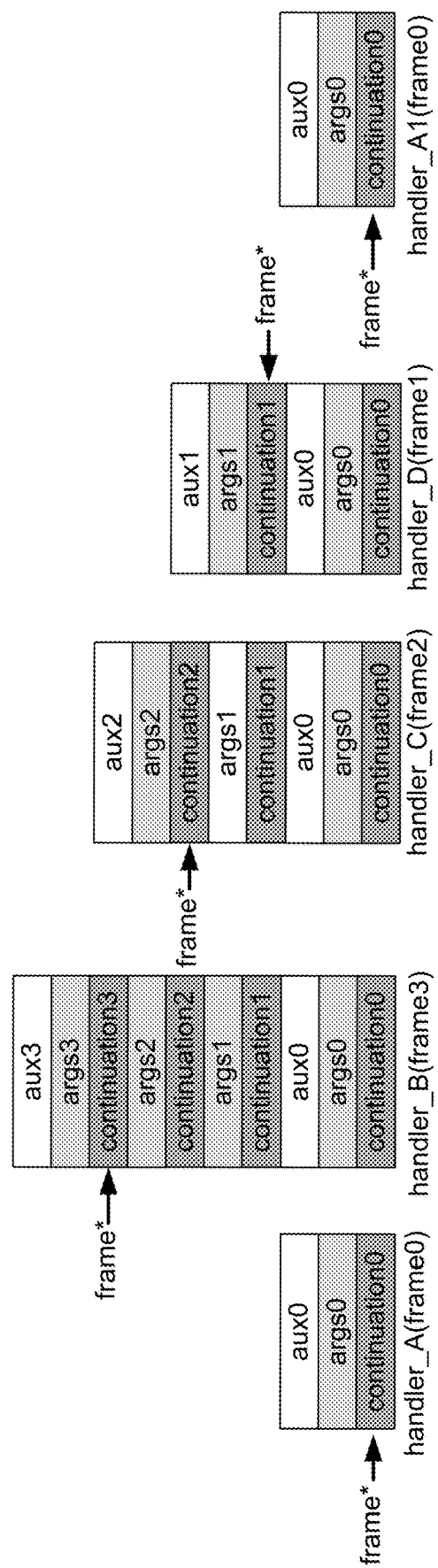
FIG. 15 is a conceptual diagram illustrating an example of chaining WU handlers.

FIG. 15 is a conceptual diagram illustrating an example of chaining WU handlers. With the structure of a WU stack as described herein, the sequencing process described with respect to FIG. 14 is unnecessary. WU stacks allow multiple frames to be pushed onto the stack and chained together to execute a sequence of WU handlers back-to-back. In the illustrated example of FIG. 15, the sequence of operations to execute is A, B, C, and D. To achieve this sequence, handler_A pushes multiple stack frames (i.e., frame1, frame2, and frame3) onto the WU stack. The first handler to execute is pushed onto the stack last. So, handler_A first pushes frame1 for handler_D, then pushes frame2 for handler_C, and last pushes frame3 for handler_B. The continuation WU for each frame points to the next function to execute, so continuation3 in frame3 references frame2 and handler_C. Likewise, continuation2 in frame2 references frame 1 and handler_D. Frame1 includes a regular return stack frame to the handler_A1 return handler.

At the time of push, each WU stack frame may only include a continuation and input/output parameters. The auxiliary variables may be allocated by the handlers themselves upon execution. For example, as illustrated in FIG. 15, when handler_B is executing, the auxiliary variables for frame3 (aux3) are added to the WU stack, when handler_C is executing, the auxiliary variables for frame2 (aux2) are added to the WU stack, and when handler_D is executing, the auxiliary variables for frame1 (aux1) are added to the WU stack. Note that in the chaining process only as many WUs are executed as there are handlers called.

Using the convention that output parameters are pointers to storage allocated by the stack frame creator, it is possible to forward the outputs from one handler into the inputs of the next. As illustrated by arrow 310 in FIG. 13, the output parameter for frame1 (frame1.out0) points to one of the input parameters for fram0 (frame0.in1). It is also worth noting that it is not a problem for handlers to allocate an arbitrary amount of space for auxiliary variables in this scheme. When each handler is executing, it owns the "hottest" frame on the stack and may expand over the top of previously used stack frames without consequence.

Figure 16:
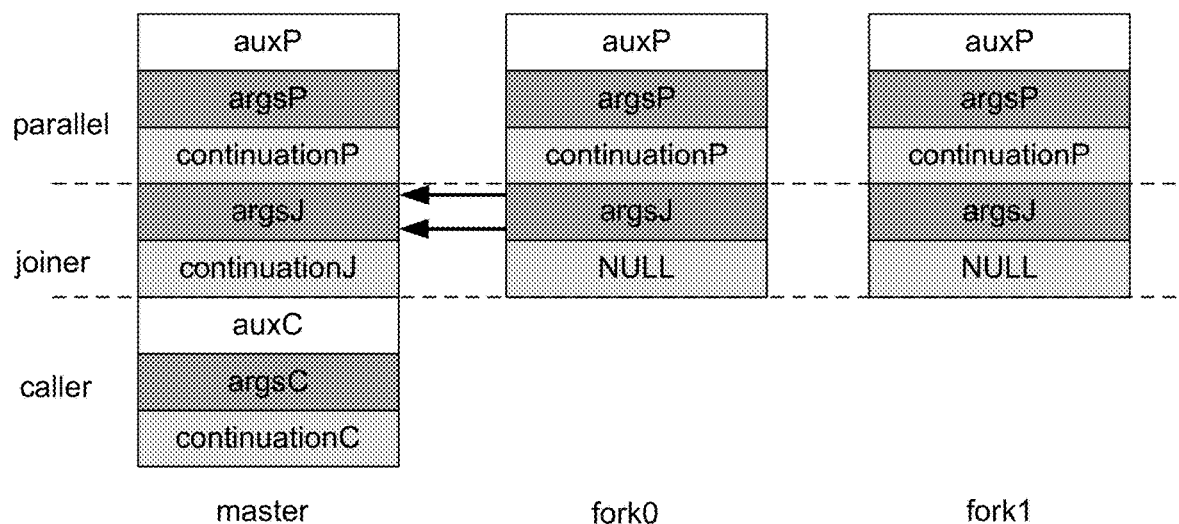
FIG. 16 is a conceptual diagram illustrating an example of master and forked WU stacks for a parallel join operation.

FIG. 16 is a conceptual diagram illustrating an example of master and forked WU stacks for a parallel join operation. The data plane software stack of the operating system executed on the access nodes described above (e.g., any of access nodes 17, 130, or 150) is an inherently parallel system. As a fundamental operation, WU stacks provide support for a parallel join operation that allows multiple events to be dispatched via WUs, and invocation of a specified WU handler once all those operations have completed.

In the example illustrated in FIG. 16, each parallel operation occurs on a distinct stack, with each stack having a "joiner" frame inserted via chaining to manage the completion notification. The join operation is initially setup from a master stack, in this case the handler "caller." The caller pushes a chain including a master joiner frame and the parallel handler for the master frame onto the current stack. The parallel frame is the "hotter" frame in the WU stack.

The caller also creates a series of new, "fork" stacks having somewhat similar chained layouts. The "coldest" frame on each of the forked stacks are joiners, and the "hottest" frame on each of the forked stacks are the parallel event handlers. The arguments to the joiner functions (argsJ) contain the linkage necessary to account for the join. The master stack includes a counter of outstanding handlers, and each of the forked stacks includes pointers to the master stack and the counter. The continuation handler for each parallel function is the joiner WU handler. The joiner WU handler is provided in the runtime, and is responsible for decrementing the outstanding handler count in the master frame and freeing the forked stacks. The last handler to finish executing decrements the counter to zero, and sends the WU "continuationJ" from the master stack. This is the notification of the completion of all parallel operations.

Figure 17:
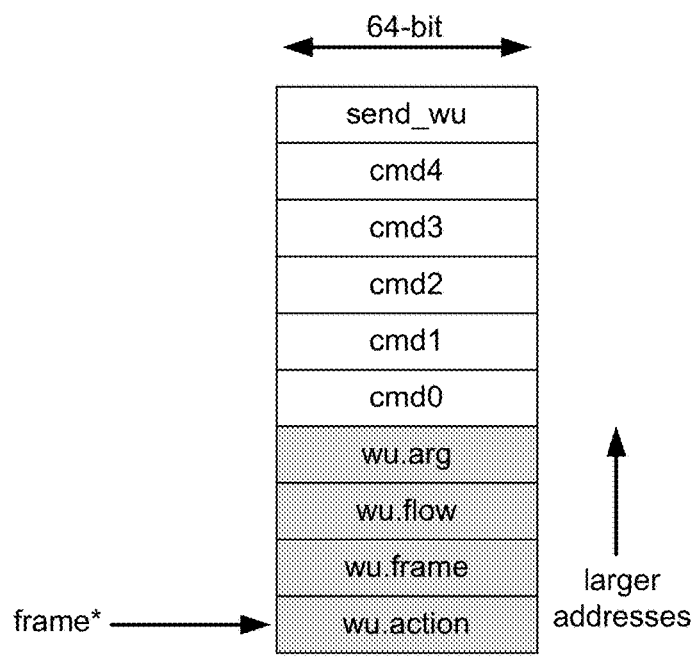
FIG. 17 is a conceptual diagram illustrating an example WU stack frame with hardware commands as arguments.

FIG. 17 is a conceptual diagram illustrating an example WU stack frame with hardware commands as arguments. For the above described access nodes, it may be desirable for hardware, e.g., accelerators 189 in processing cluster 180 from FIG. 4A, to adopt the fundamentals of the data plane software stack of the operating system. A general adaptation of the calling process for the data plane software stack, described with respect to FIG. 11, may provide maximum flexibility in software. To adapt the calling process, the location of the frame pointer argument in the WU and the structure of the continuation and arguments in the WU stack frame, as shown in FIG. 8, may remain the same for use on hardware units. In this way, software constructs may call and operate on hardware units similar to software.

An example of an input to a hardware unit accepting commands is illustrated in FIG. 17. In the example, software may be able to send a WU stack with a frame argument pointing to a structure. In this case, hardware commands may be passed as WU stack input variables (cmd0-cmd4). In some examples, one command (send_wu) at the end of a command queue may send the continuation WU that is in the regular frame location. In other examples, the hardware may not need an explicit command and will send the continuation WU on completion by default. Error cases may be handled with other WUs programmed into the hardware directly for generic handlers, or other WUs passed as input parameters for per-operation error handling.

By adopting the standard WU stack frame layout in hardware, standard WU stack software may be employed transparently between hardware, e.g., the chaining process described above with respect to FIG. 15. In this way, a stack chain may be configured with multiple software and/or hardware operations in sequence. As described above, each stage of the chain sends the continuation WU in the frame to the next stage. No handler in the chain need know nor care whether the next handler is a software or hardware operation; it only needs to know to send the continuation WU.

Similar to chaining, parallelism, as described above with respect to FIG. 16, may also work transparently between software and hardware if both use compatible WU stack frame formats. Continuing the discussion on parallelism with respect to FIG. 16, there is no need for each parallel handler to be implemented in software. Some or all parallel handlers may be hardware units. A continuation WU from a parallel handler's frame pointer will send a WU to the appropriate joiner handler, and software will handle the join and notification regardless of whether the parallel handler is software or hardware. This may allow hardware units to be first class citizens in the WU compiler and runtime language/compiler.

Figure 18:
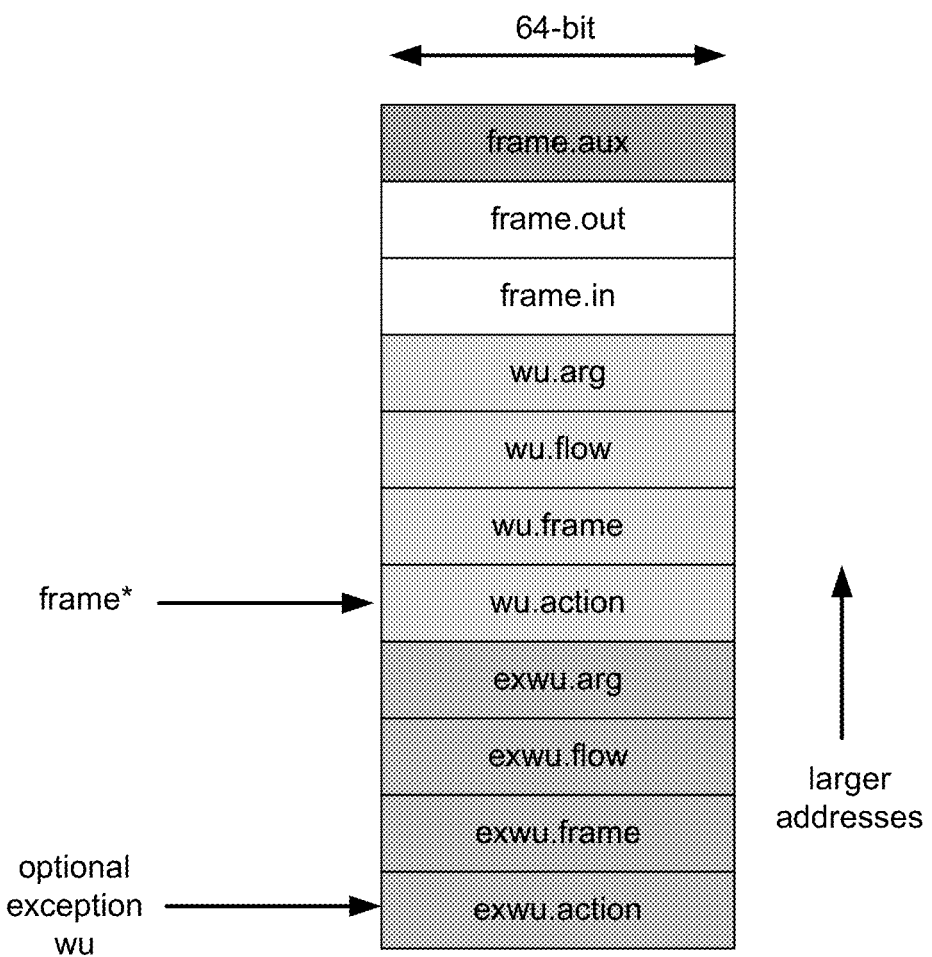
FIG. 18 is a conceptual diagram illustrating an example WU stack frame with an exception WU stack.

FIG. 18 is a conceptual diagram illustrating an example WU stack frame with an exception WU stack, which supports exception-like semantics on the WU stack. These exceptions may closely mirror the exception model of classical programming exceptions in that:

At some level in the call stack, a function registers an exception handler (e.g., "try").

At any arbitrary level below that call frame, code may "raise" an exception. A raised exception causes direct return to the closest exception handler registered, which is possibly multiple levels up the callstack, and no code from functions in between is called.

Exceptions are used for exceptional events. Exceptions are not the common path, and should not be used for standard control flow.

In general, there may be multiple exceptions registered at various points in the stack. The first exception encountered traversing back up the stack is invoked when an exception is raised. That first encountered exception handler may choose to handle the exception implicitly via continuing normal execution, or raise another exception to the next highest exception handler.

In some example implementations, there are also some features to note in the design for WU stack exceptions, such as:

There is no provision for "auto" variables or destructors for intermediate callstack frames between the exception being raised and the exception handler being invoked (i.e., the "try").

WU stack exception handlers are WU continuation handlers and, as such, do not preserve the C stack. The WU stack exception handlers may, however, preserve the WU stack frame.

There is no filtering of exceptions by the runtime. At any frame in the WU stack, either all exceptions are caught or none are caught, but some exception handlers may choose to manually forward exceptions higher.

The general model is that a WU handler that calls another WU subsystem on the stack may push an exception frame onto the WU stack in order to catch any exceptions raised by that subsystem or any additional subsystem it calls. The exception executes the WU handler function setup at the time the exception frame is placed on the stack. Moreover, the callee subsystem does not need to know whether an exception frame is configured in an immediate, or any other, colder frame. When any handler encounters an exception condition, an exception may be raised. At this point, the least cold exception WU handler on the stack is invoked.

An exception may be pushed onto the WU stack with an explicit destination or to be executed "anywhere." The specific destination and anywhere variants of the regular and exception push functions may be freely mixed and matched. It may be required, however, that a regular continuation be pushed directly on top of the exception frame. Exception frames do not carry in/out/aux variables, and no handlers execute with the frame pointer of the exception WU. It is important to split the exception and the standard continuation into two functions for a number of reasons:

The exception may be conditionally pushed without changing which function is called for the standard WU.

With subsystems implementing stack pushes, the caller may push the exception continuation and the callee may push the standard continuation. The callee does not need to know what the caller is doing with the exception frame.

With multiple variants for destinations of WUs, having two function calls prevents explosion of the function space because of the explicit and implicit destination variants of the exception and standard continuations.

WU stack exceptions fundamentally involve carrying an extra exception WU around on the stack. Mechanically, these are to be placed after the auxiliary variables of the frame in which the exception will be handled. As illustrated in FIG. 18, this places the exception continuation WU immediately before the continuation WU for the hotter frame from the exception handling frame. As shown in FIG. 18, the exception WU has the same format as a regular WU, including the fields of exwu.action, exwu.frame, exwu.flow, and exwu.arg. The exception WU is optional in the WU stack. The space is only allocated on the WU stack when the exception WU is explicitly inserted by a WU handler.

In some examples, the WU stack may provide an exception model for handling abnormal events and a 'success bypass' to shortcut a long series of operations. For example, as described above, an exception WU may be used to define work to be skipped as a result of raising the exception. For example, if an exception is raised, the exception WU may return the stack to an exception handler earlier in the processing flow and skip the remaining processing steps in the flow. The exception WU may move the stack to a different processing flow of WU handlers that are only executed if the exception is raised.

In some example implementations, a WU may be used as a 'success bypass handler' for controlling execution with respect to a WU stack. For example, it is common that a computation needed to be performed on data consists in a succession of pipeline stages, stitched together by means of the WU stack. However, in certain cases is may be possible to accelerate the execution when a fast result can be provided based on the data. To implement that concept, a software function pushes early onto the WU stack a "success bypass handler" which is a normal WU continuation frame, except the rest of the stack is not linked with it. This handler is marked specially in the WU stack so that it can be found if certain conditions arise. The pipelined execution then proceeds, but if a "success condition" is met, the runtime provides a function to locate the most recent frame for a success bypass handler in the WU stack, and continues program execution directly to it (i.e., by sending a continuation), in essence bypassing all the WU stack continuations pushed after the success handler.

Figure 19:
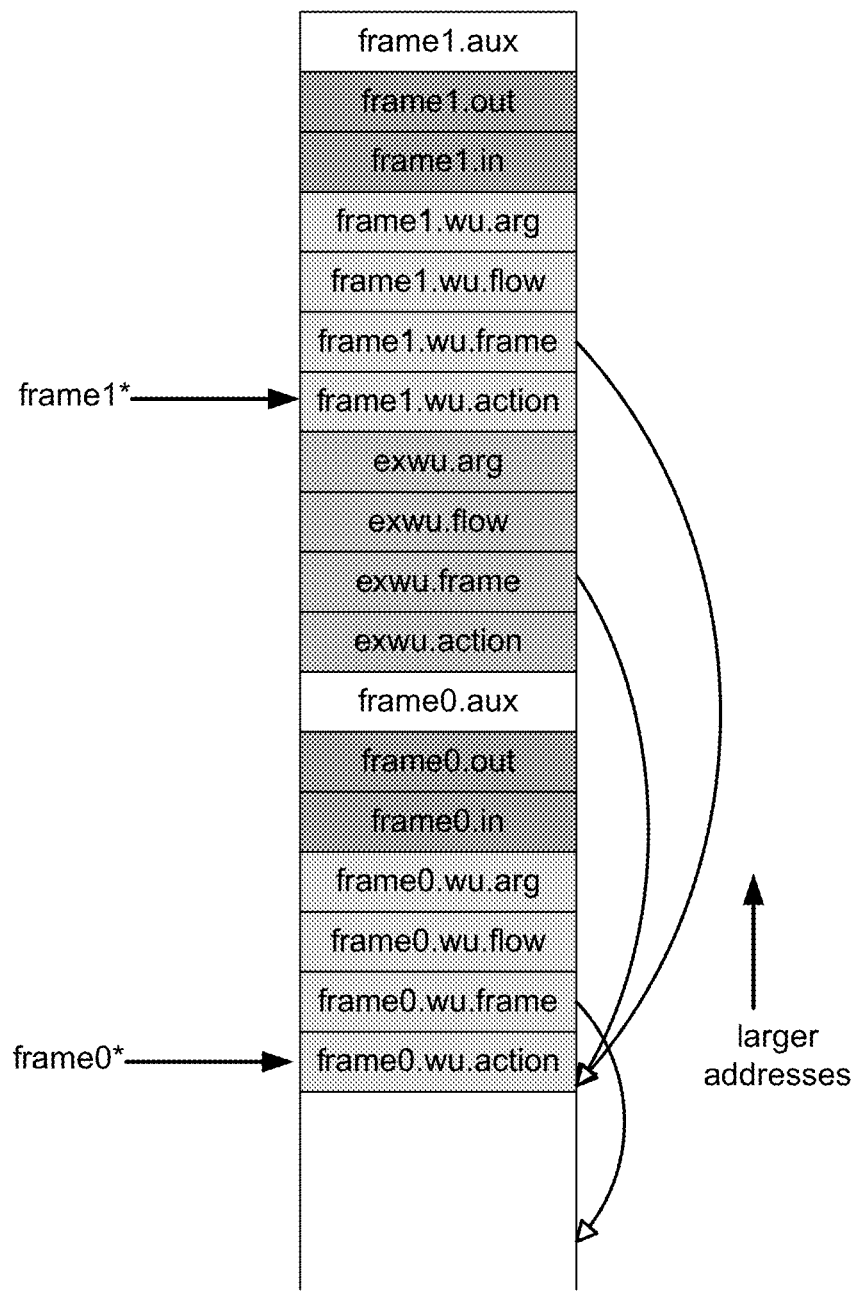
FIG. 19 is a conceptual diagram illustrating an example of exception WU stack linking.

FIG. 19 is a conceptual diagram illustrating an example of exception WU stack linking. A hotter frame in the WU stack raising an exception has no visibility into how far up the stack the exception may be caught. As example of the linkage for the WU stack when an exception WU is present is illustrated in FIG. 19. As shown, the frame pointers of both the exception WU (exwu.frame) and the hotter frame continuation WU (frame1.wu.frame) point to the continuation WU of frame0. The fact that the frame pointer in the frame1 continuation is the same as described for a regular WU stack (FIG. 13) means that a hotter frame still sends a continuation as per the existing rules even when an exception WU is included in the WU stack. This also means that existing hardware designs to send completion continuations are unmodified. It is not expected that hardware would understand the WU stack exception model, so exceptions due to hardware events may need to be raised from the software driving the hardware. This also means that a naive "getcolder" walk up the WU stack from a hotter frame (e.g., frame1) will skip over the exception WU.

In order to find an exception WU, magic cookies may be encoded in the source field of the WU format ("s" in FIGS. 6A, 6B) in both the exception WU and the hotter continuation WU. The cookies may have three different values:

No exception. This is the standard encoding for continuation WUs that have no exception handler registered.

Exception WU. The cookie value used on an exception WU action. This identifies the WU as a being a valid exception WU.

Colder has exception. The cookie value used in the continuation WU of the frame one hotter than the exception WU, e.g., frame1 in FIG. 19. This identifies the hotter frame as having a valid exception WU that should be taken if an exception is raised. Some semantics may be modified or introduced the manage the exceptions.

Figure 20:
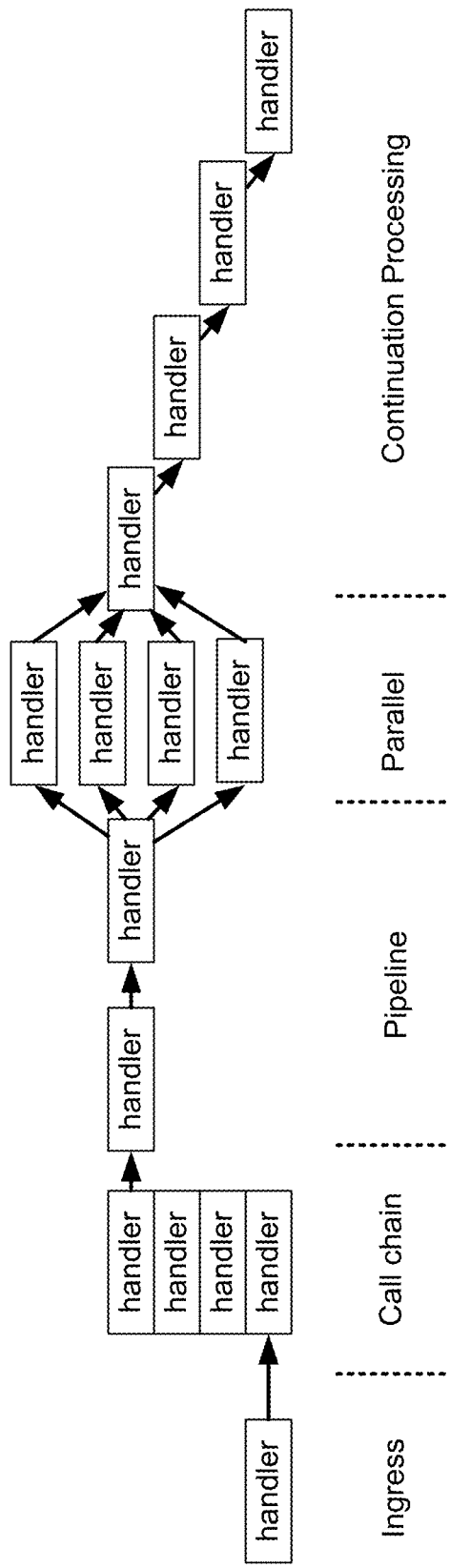
FIG. 20 is a conceptual diagram illustrating an example WU stack execution model.

FIG. 20 is a conceptual diagram illustrating an example WU stack execution model. As described above, the WU stack execution model seamlessly blends hardware and software functions to perform call chaining, pipelining, parallelization, and continuation processing. The WU stack enables standardization of a pipeline and service execution model. The WU stack also provides familiar call/return semantics for operations on streams of work units (e.g., packets), and enables optional bundling of state carried with a work unit (packet). Furthermore, the WU stack allows stream processing model and a more traditional computational model to be integrated in a 2D execution model, as illustrated in FIG. 20, thereby providing significant technical advantages during software development as well as execution at run-time.

Figure 21:
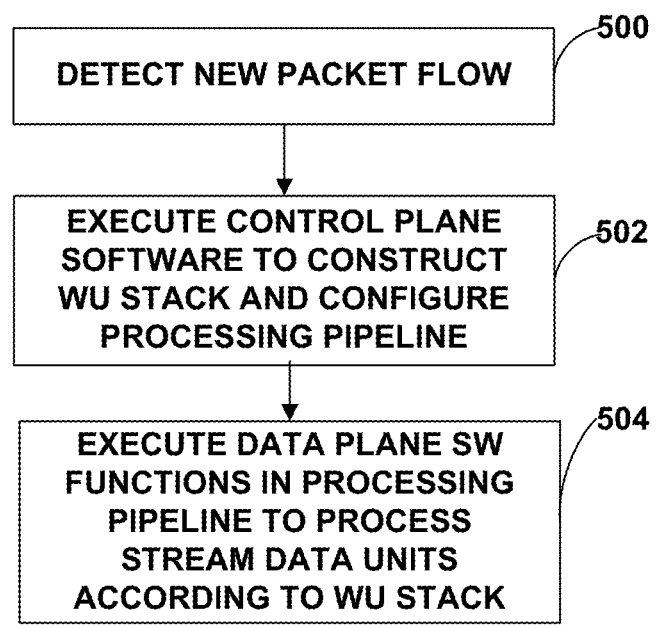
FIG. 21 is flowchart illustrating example operation of a DPU when implementing example WU stack techniques described herein.

FIG. 21 is flowchart illustrating example operation of a DPU when implementing example WU stack techniques described herein. FIG. 21 is described in reference to DPU 60 of FIG. 1B for purposes of example and may represent example operation of any of the data processing units described herein, such as DPU 60, DPU 130 or DPU 150.

In this example, DPU 60 detects a new stream, e.g., a new packet flow (500). For example, the data plane of DPU 60 may determine that a received packet is an initial packet of a packet flow not currently identified within a flow table installed with the data plane where each entry in the flow table specifies a particular data stream, such as a five tuple identifying the data stream, e.g., source IP address, destination IP address, source MAC address, destination MAC address and port.

Upon detecting a new data stream, software executing in control plane 66 construct work units (WUs) arranged in a stack within memory (502). Each of the work unit specifies a particular one of the WU handlers (i.e., a respective function of library 70 to be executed on run-to-completion data plane OS 62) for processing one or more stream data units of the data stream. Moreover, each of the WUs in the WU stack may further specify a particular one of the cores for executing the respective WU handler identified by the WU. In one example, at least one of the work units within the WU stack includes an identifier of a second work unit within the WU stack for further processing the stream data unit(s) upon completion of the initial work unit. In this way, the WU stack constructed by the application-level software executing on control plane OS 82 can be constructed to logically define, for a given one or more streams of data, the processing cores into a processing pipeline having a plurality of stages that are configured to execute the plurality of work units (WU) arranged as the WU stack to perform stream processing tasks on the stream data units of the newly detected data stream. In other examples, WU stacks may be preconfigured and installed prior to detecting a new data stream.

Once the WU stack is configured, data plane 64 of DPU 60 operates according to the WU stack to process the stream of data with the processing pipeline (504). As described herein, while processing the stream data units, WU handlers executing on data plane 62 may implement additional stack operations on the WU stack for the data stream, e.g., pushing new WUs on a stack, allocating new WU stacks, raising exceptions and the like.

Various examples have been described. These and other examples are within the scope of the following claims.

What is claimed is:

1. A device comprising:
    a plurality of processing cores, each of the cores configured to execute one or more of a plurality of software work unit handlers (WU handlers);
    a coherent cache memory configured to store a plurality of work units arranged as a work unit stack (WU stack), each of the work units including:
        first information identifying a stream data unit comprising one or more network packets stored in a non-coherent buffer memory,
        second information specifying a particular one of the WU handlers for processing the stream data unit, and
        third information specifying a particular one of the cores for executing the WU handler,
        wherein each of first information, second information, and third information are separate, and
        wherein at least a first work unit within the WU stack includes an identifier of a second work unit within the WU stack for further processing the stream data after completion of the first work unit; and
    a data plane configured to enable processing of each work unit in the plurality of work units, wherein for each respective work unit in the plurality of work units, the data plane provides the respective work unit to the specified processing core for processing the identified stream data unit by the specified WU handler.

2. The device of claim 1, wherein one or more of the WU handlers are configured to, when executed by the processing core, perform stack operations on the work unit stack.

3. The device of claim 2, wherein the stack operations include a push operation to push an additional work unit unto the WU stack for performing a subsequent operation on the stream data unit.

4. The device of claim 1, wherein at least one of the work units within the WU stack includes one or more fields to store input or output arguments for the WU handlers when executing on the cores and processing the stream data unit.

5. The device of claim 1, wherein at least one of the work units within the WU stack includes one or more fields to store auxiliary variables used by the WU handlers when performing a subsequent operation on the stream data unit.

6. The device of claim 1, further comprising a plurality of work unit queues (WU queues), each of the work unit queues associated with a different one of the processing cores and configured to store a plurality of work units enqueued for execution by the processing cores.

7. The device of claim 1,
wherein at least one of the work units arranged within the WU stack includes an identifier designating the work unit as a success bypass handler work unit, and
wherein the success bypass handler work unit is executed upon a success condition instead of execution of one or more of the other work units that are located within the WU stack after the success bypass handler work unit toward a top of the WU stack.

8. The device of claim 1, wherein the data place comprises:
a run-to-completion data plane operating system executing on two or more of the plurality of programmable processing cores,
wherein each of the software WU handlers comprises a run-to-completion software function invoked on the data plane operating system on one of the plurality of programmable processing cores to process the stream data unit.

9. The device of claim 8, further comprising:
a host interface configured to send and receive the network packets with an application processor or a storage device; and
a multi-tasking control plane operating system executing on one or more of the plurality of programmable processing cores.

10. The device of claim 9, further comprising a control plane software stack executing on the data plane operating system on at least one of the programmable processing cores, wherein the control plane software stack comprises a hypervisor and the multi-tasking control plane operating system executing on the hypervisor.

11. The device of claim 9, wherein at least one of the programmable processing cores executing the control plane operating system comprises an independent processing core dedicated to the control plane operating system.

12. The device of claim 9, further comprising one or more control plane service agents executing on the control plane operating system, the control plane service agents configured to perform set up and tear down of software structures to support work unit processing performed by the software function executing on the data plane operating system.

13. A device comprising:
a non-coherent memory unit configured to store stream data;
a networking unit configured to manage input and output of the data between a network and the device;
a plurality of queues configured to hold work units, wherein each of the work units is stored in coherent cache memory and includes first information identifying a portion of the stream data and second information specifying operations to be performed on the portion of the stream data, wherein the first information and the second information are separate within each of the work units;
a plurality of processing cores in communication with the non-coherent memory unit, the networking unit, and the plurality of queues, wherein the plurality of processing cores are arranged in a processing pipeline having a plurality of stages and are configured to execute a plurality of work units arranged as a work unit (WU) stack to perform stream processing tasks on the stream data,
wherein a first one of the plurality of processing cores is configured, as a first one of the stages, to execute a first WU handler specified by a first WU of the WU stack to perform the operations on the portion of the stream data identified in the first WU, and
wherein a second one of the plurality of processing cores is configured, as a second one of the stages, to execute a second WU handler specified by a second WU of the WU stack for a subsequent processing stage to perform one or more additional operations on the portion of the stream data identified in the first WU, and wherein the second WU specifies the second one of the plurality of processing cores executing the second WU handler; and
a data plane configured provide the first WU to the first one of the plurality of processing cores for processing the portion of the stream data by the first WU handler, and provide the second WU to the second one of the plurality of processing cores for processing the portion of the stream data by the second WU handler.

14. The device of claim 13, wherein the second WU included in the WU stack comprises a continuation work unit used to invoke a WU handler for the subsequent processing stage.

15. The device of claim 13, further comprising one or more hardware accelerator units implemented in circuitry, wherein at least one of the hardware accelerator units is configured to:
perform one or more hardware commands included in a WU stack frame included in the WU stack, wherein the WU stack frame comprises at least a continuation work unit and the one or more hardware commands as input parameters of the continuation work unit; and
upon completion of the one or more hardware commands, proceed to a subsequent processing stage identified in the continuation work unit.

16. The device of claim 13, wherein the WU stack includes at least one WU stack frame that comprises at least a continuation work unit that includes an action field that identifies a WU handler, a frame field that includes a pointer to a WU stack frame, a flow field that includes a pointer to state data for the identified WU handler, and a packet field that includes a pointer to a packet of the data to be processed.

17. The device of claim 16, wherein the WU stack frame includes one or more parameter fields that each identifies an input parameter to the WU handler of the continuation work unit or an output parameter from the WU handler of the continuation work unit.

18. The device of claim 16, wherein the at least one WU stack frame includes one or more auxiliary fields that each identifies an auxiliary variable for the WU handler of the continuation work unit.

19. The device of claim 13, wherein one of the processing cores is configured to execute the first WU handler for a logical operation on a WU stack frame included in the WU stack.

20. The device of claim 13 wherein, to call a second logical operation from a first logical operation, two or more the processing cores are configured to:
execute the first WU handler for the first logical operation according to a first WU stack frame included in the WU stack, wherein the first WU handler allocates a second WU stack frame onto the WU stack, and constructs a new work unit to invoke the second WU handler; and execute the second WU handler for the second logical operation on the second WU stack frame without modifying the state of the first WU stack frame included in the WU stack.

21. The device of claim 13, wherein, to perform a second logical operation on the stream data and return to a first logical operation being performed on the stream data, one or more of the processing cores are configured to:
execute the first WU handler for performing a first function of the first logical operation on the stream data according to a first WU stack frame included in the WU stack, wherein the first WU handler allocates a second WU stack frame onto the WU stack that includes at least a continuation work unit, and constructs a new work unit to invoke the second WU handler;
execute the second WU handler for performing the second logical operation on the stream data according to the second WU stack frame without modifying the state of the first WU stack frame included in the WU stack, wherein the continuation work unit included in the second WU stack frame invokes a third WU handler for the first WU stack frame; and
execute the third WU handler for a second function of the first logical operation on the first WU stack frame.

22. The device of claim 21, wherein, to facilitate the return to the first logical operation, the first WU handler constructs the continuation work unit included in the second WU stack frame to identify the third WU handler and include a pointer to the first WU stack frame.

23. The device of claim 13, wherein, to execute a chain of logical operations on the stream data, one or more of the processing cores are configured to:
execute the first WU handler for performing a first function of a first logical operation on the stream data according to a first WU stack frame included in the WU stack, wherein the first WU handler allocates a second WU stack frame above the first WU stack fame and allocates a third WU stack frame above the second WU stack frame on the WU stack, and constructs a new work unit to invoke the second WU handler;
execute the second WU handler for performing a second logical operation on the stream data according to the third WU stack frame, wherein a continuation work unit included in the third WU stack frame references a third WU handler and the second WU stack frame;
execute the third WU handler for performing a third logical operation on the stream data according to the second WU stack frame, wherein a continuation work unit included in the second WU stack frame references a fourth WU handler and the first WU stack frame; and
execute the fourth WU handler for performing a second function of the first logical operation on the stream data according to the first WU stack frame.

24. The device of claim 23, wherein, at the time of allocation by the first WU handler, the second WU stack frame and the third WU stack frame each include a continuation work unit and at least one of input or output parameters, and wherein each of the WU handlers allocates auxiliary variables for the respective WU stack frames upon execution.

25. The device of claim 13, wherein, an output parameter from the third WU handler for the second WU stack frame is a pointer to an input parameter to the fourth WU handler for the first WU stack frame.

26. The device of claim 13, wherein, to perform a first logical operation and a second logical operation on the stream data in parallel, one or more of the processing cores are configured to:
execute a caller handler on a master WU stack, wherein the caller handler allocates a master joiner frame and a master parallel frame onto the master WU stack, and constructs a first fork stack and a second fork stack that each includes a joiner frame and a parallel frame with pointers to the master stack and an outstanding handler counter in the master stack;
execute a first parallel handler for the first logical operation on the first fork stack, wherein a continuation work unit included in the parallel frame of the first fork stack decrements the outstanding handler counter in the master stack; and
execute a second parallel handler for the second logical operation on the second fork stack, wherein a continuation work unit included in the parallel frame of the second fork stack decrements the outstanding handler counter in the master stack,
wherein, when the outstanding handler counter in the master stack decrements to zero, the last one of the first and second parallel handers sends a continuation work unit included in the master joiner frame of the master WU stack as a notification that the parallel logical operations are complete.

27. The device of claim 13, wherein the WU stack includes at least a first WU stack frame, a second WU stack frame, and an exception work unit placed between the first and second WU stack frame on the WU stack, wherein the exception work unit is placed above the first WU stack frame in which the exception will be handled and below a continuation work unit for the second WU stack frame, and wherein, to include the exception work unit in the WU stack, at least one of the processing cores is configured to execute a first WU handler for a logical operation on the first WU stack frame, wherein the first WU handler constructs the exception work unit to identify the first WU handler and include a pointer to the first WU stack frame, and inserts the exception work unit in the WU stack.

28. The device of claim 27,
wherein at least one of the work units includes an identifier designating the work unit as a success bypass handler work unit, and
wherein the success bypass handler work unit is executed upon a success condition instead of execution of one or more of the other work units located after the success bypass handler work unit in the WU stack.

29. The device of claim 13, wherein the data plane includes:
a run-to-completion data plane operating system executing on two or more of the plurality of programmable processing cores,
wherein each of the first and second WU handlers comprises a run-to-completion software function invoked on the data plane operating system on one of the plurality of programmable processing cores to process the work unit.

30. The device of claim 13, further comprising:
a host interface configured to send and receive the packets with an application processor or a storage device; and
a control plane software stack executing on the data plane operating system on at least one of the programmable processing cores, wherein the control plane software stack comprises a hypervisor and a multi-tasking control plane operating system executing on the hypervisor.

31. A method comprising:

storing, within coherent cache memory, a plurality of work units arranged as a work unit stack (WU stack), each of work units including:
   first information identifying stream data stored in non-coherent buffer memory,
   second information specifying a particular software WU handler configured to perform an operation on the stream data, and
   third information specifying a particular one of a plurality of processing cores of a multi-core processor for executing the respective WU handlers,
   wherein each of the first information, the second information, and the third information are separate, and
   wherein a first one of the work units within the WU stack includes an identifier of a second one of the work units within the WU stack for further processing a first stream data unit upon completion of the first work unit; and processing the stream data according to the WU stack of work units, wherein processing the stream data includes, for each respective work unit in the plurality of work units, providing the respective work unit to the specified processing core for processing the identified stream data unit by the specified WU handler.

32. The method of claim 31, responsive to execution of a software WU handler by the processing core according one of the work units of the WU stack, performing at least one stack operation on the work unit stack as specified by the work unit, wherein the at least one stack operation include a push operation to push an additional work unit unto the WU stack for performing a subsequent operation on the stream data.

33. The method of claim 31, wherein at least one of the work units within the WU stack includes one or more fields to store input or output arguments for the WU handlers when executing on the cores and processing the stream data unit.

* * * * *